(12) United States Patent
Ronen

(10) Patent No.: US 11,914,161 B2
(45) Date of Patent: Feb. 27, 2024

(54) APPARATUS AND METHODS FOR EYE TRACKING BASED ON EYE IMAGING VIA LIGHT-GUIDE OPTICAL ELEMENT

(71) Applicant: Lumus Ltd., Ness Ziona (IL)

(72) Inventor: Eitan Ronen, Rechovot (IL)

(73) Assignee: LUMUS LTD., Ness Ziona (IL)

( * ) Notice: Subject to any disclaimer, the term of this patent is extended or adjusted under 35 U.S.C. 154(b) by 276 days.

(21) Appl. No.: 17/622,832

(22) PCT Filed: Jun. 25, 2020

(86) PCT No.: PCT/IL2020/050715
§ 371 (c)(1),
(2) Date: Dec. 26, 2021

(87) PCT Pub. No.: WO2020/261279
PCT Pub. Date: Dec. 30, 2020

(65) Prior Publication Data
US 2022/0334399 A1   Oct. 20, 2022

Related U.S. Application Data

(60) Provisional application No. 62/869,582, filed on Jul. 2, 2019, provisional application No. 62/867,249, filed on Jun. 27, 2019.

(51) Int. Cl.
*G02B 27/01* (2006.01)
*G02B 6/42* (2006.01)
*G06F 3/01* (2006.01)

(52) U.S. Cl.
CPC ........... *G02B 27/0179* (2013.01); *G02B 6/42* (2013.01); *G02B 6/4204* (2013.01);
(Continued)

(58) Field of Classification Search
CPC .... G02B 27/0179; G02B 6/4298; G02B 6/42; G02B 6/4204; G02B 2027/0187; G06F 3/013
See application file for complete search history.

(56) References Cited

U.S. PATENT DOCUMENTS 2,329,001 A   9/1943   Van King
2,748,659 A   6/1956   Geffcken et al.
(Continued)

FOREIGN PATENT DOCUMENTS

CN   101542346       9/2009
CN   104570353 A     4/2015
(Continued)

OTHER PUBLICATIONS

S. Chattopadhyay et al: "Anti-reflecting and photonic nanostructures", Materials Science and Engineering: R: Repots, vol. 69, No. 1-3, Jun. 20, 2010, pp. 1-35.
(Continued)

*Primary Examiner* — Kwang-Su Yang
(74) *Attorney, Agent, or Firm* — Rivka Friedman

(57) ABSTRACT

A light-transmitting substrate has parallel surfaces deployed with a first of the parallel surfaces in facing relation to an eye. An optical element is associated with the first surface and applies optical power to incident light of a first type so as to collimate the incident light, and applies substantially no optical power to incident light of a second type. An optical coupling configuration is associated with the substrate and is configured for coupling-in a proportion of collimated light of the first type incident on the first surface so as to propagate within the substrate, and for coupling-out a proportion of light of the second type propagating within the substrate. Optics associated with the substrate convert collimated light of the first type into converging beams of light, which are sensed by an optical sensor. A processor derives
(Continued)

current gaze direction of the eye by processing signals from the optical sensor.

14 Claims, 15 Drawing Sheets

(52) U.S. Cl.
CPC .......... *G02B 6/4298* (2013.01); *G06F 3/013* (2013.01); *G02B 2027/0187* (2013.01)

(56) References Cited

U.S. PATENT DOCUMENTS

| | | |
|---|---|---|
| 2,795,069 A | 6/1957 | Hardesty |
| 2,886,911 A | 5/1959 | Hardesty |
| 3,491,245 A | 1/1970 | Hardesty |
| 3,544,190 A | 1/1970 | Moorhusen |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | ST Leger |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Maechler |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,770,847 A | 6/1998 | Olmstead |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 5,999,836 A | 12/1999 | Nelson |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,643,214 B2 | 1/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,872,217 B2 | 1/2011 | Kasahara |
| 7,949,214 B2 | 5/2011 | Dejong |
| 7,949,252 B1 | 5/2011 | Georgiev |
| 7,995,275 B2 | 8/2011 | Maeda et al. |
| 8,004,765 B2 | 8/2011 | Amitai |
| 8,035,872 B2 | 10/2011 | Ouchi |
| 8,187,481 B1 | 5/2012 | Hobbs |
| 8,369,019 B2 | 2/2013 | Baker |
| 8,405,573 B2 | 3/2013 | Lapidot et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,873,148 B1 | 10/2014 | Gupta et al. |
| 8,913,865 B1 | 12/2014 | Bennett |
| 8,965,152 B2 | 2/2015 | Simmonds |
| 8,976,452 B2 | 3/2015 | Takagi et al. |
| 9,248,616 B2 | 2/2016 | Amitai |
| 9,523,852 B1 | 12/2016 | Brown et al. |
| 9,804,396 B2 | 10/2017 | Amitai |
| 9,805,633 B2 | 10/2017 | Zheng |
| 9,933,684 B2 | 4/2018 | Brown et al. |
| 9,953,592 B2 | 4/2018 | Zheng et al. |
| 10,048,499 B2 | 8/2018 | Amitai |
| 10,191,288 B2 | 1/2019 | Singer et al. |
| 10,261,321 B2 | 4/2019 | Amitai |
| 10,302,835 B2 | 5/2019 | Danziger |
| 10,520,733 B2 | 12/2019 | Takeda et al. |
| 10,739,598 B2 | 8/2020 | Ofir |
| 10,830,938 B2 | 11/2020 | Eisenfeld |
| 11,221,294 B2 | 1/2022 | Aldaag et al. |
| 11,442,273 B2 | 9/2022 | Danziger et al. |
| 2001/0030860 A1 | 10/2001 | Kimura et al. |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |

(56) References Cited

U.S. PATENT DOCUMENTS

| | | |
|---|---|---|
| 2003/0090439 A1 | 5/2003 | Spitzer et al. |
| 2003/0197938 A1 | 10/2003 | Schmidt et al. |
| 2003/0218718 A1 | 11/2003 | Moliton et al. |
| 2004/0084088 A1 | 5/2004 | Callies |
| 2004/0085649 A1 | 5/2004 | Repetto et al. |
| 2004/0108971 A1* | 6/2004 | Waldern ............... G02B 27/017 345/8 |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0073577 A1 | 4/2005 | Sudo |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | AMitai |
| 2005/0225866 A1 | 10/2005 | Abu Ageel |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0146518 A1 | 7/2006 | Dubin |
| 2006/0153518 A1 | 7/2006 | Abu AGeel et al. |
| 2006/0268421 A1 | 11/2006 | Shimizu et al. |
| 2007/0052929 A1 | 3/2007 | Allman et al. |
| 2007/0070859 A1 | 3/2007 | Hirayama |
| 2007/0159673 A1 | 7/2007 | Freeman et al. |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0247150 A1 | 10/2008 | itoh et al. |
| 2008/0278812 A1 | 11/2008 | Amitai |
| 2008/0316606 A1 | 12/2008 | Inoguchi et al. |
| 2009/0010023 A1 | 1/2009 | Kanada et al. |
| 2009/0052046 A1 | 2/2009 | Amitai |
| 2009/0122414 A1 | 5/2009 | Amitai |
| 2009/0168134 A1 | 7/2009 | Nojima |
| 2009/0190222 A1 | 7/2009 | Simmonds et al. |
| 2010/0067110 A1 | 3/2010 | Amitai et al. |
| 2010/0110368 A1 | 5/2010 | Chaum |
| 2010/0111472 A1 | 5/2010 | DeJong |
| 2010/0202128 A1 | 8/2010 | Saccomanno |
| 2010/0278480 A1 | 11/2010 | Vasylyev |
| 2010/0290124 A1 | 11/2010 | Tohara |
| 2010/0291489 A1 | 11/2010 | Moskovits et al. |
| 2011/0050595 A1 | 3/2011 | Lunback et al. |
| 2011/0096566 A1 | 4/2011 | Tsai et al. |
| 2011/0191690 A1 | 8/2011 | Hang et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz |
| 2012/0113092 A1 | 5/2012 | Bar-Zeev et al. |
| 2012/0147361 A1 | 6/2012 | Mochizuki et al. |
| 2012/0194781 A1 | 8/2012 | Agurok |
| 2012/0306940 A1 | 12/2012 | Machida |
| 2013/0022316 A1 | 1/2013 | Pelletier et al. |
| 2013/0083404 A1 | 4/2013 | Takagi et al. |
| 2013/0128230 A1 | 5/2013 | Macnamara |
| 2013/0187836 A1 | 7/2013 | Cheng |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0016051 A1 | 1/2014 | Kroll |
| 2014/0043688 A1 | 2/2014 | Schrader et al. |
| 2014/0104665 A1 | 4/2014 | Popovitch |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0070864 A1 | 3/2015 | Rainer et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182748 A1 | 7/2015 | Gefen et al. |
| 2015/0185483 A1 | 7/2015 | Hiraide |
| 2015/0207990 A1 | 7/2015 | Ford |
| 2015/0219834 A1 | 8/2015 | Nichol et al. |
| 2015/0241619 A1 | 8/2015 | Richards et al. |
| 2015/0268401 A1 | 9/2015 | Hugel et al. |
| 2015/0277125 A1* | 10/2015 | Hirano ............... G02B 27/0176 359/633 |
| 2015/0033865 A1 | 11/2015 | Sawada et al. |
| 2015/0355481 A1 | 12/2015 | Hilkes et al. |
| 2016/0018639 A1* | 1/2016 | Spitzer ............... G02B 27/0103 359/13 |
| 2016/0018654 A1 | 1/2016 | Haddick et al. |
| 2016/0116743 A1 | 4/2016 | Amitai |
| 2016/0125642 A1 | 5/2016 | Zhu et al. |
| 2016/0170214 A1 | 6/2016 | Amitai |
| 2016/0234485 A1 | 8/2016 | Robbins et al. |
| 2016/0238844 A1 | 8/2016 | Dobschal |
| 2016/0247319 A1 | 8/2016 | Nowatzyk et al. |
| 2016/0278695 A1 | 9/2016 | Wang et al. |
| 2016/0282616 A1 | 9/2016 | Matsushita |
| 2016/0312913 A1 | 10/2016 | Thybo et al. |
| 2016/0341964 A1 | 11/2016 | Amitai |
| 2016/0370693 A1 | 12/2016 | Watanabe |
| 2017/0007351 A1 | 1/2017 | Yu |
| 2017/0045743 A1 | 2/2017 | Dobschal et al. |
| 2017/0075119 A1 | 3/2017 | Schultz et al. |
| 2017/0084867 A1 | 3/2017 | Lim et al. |
| 2017/0097506 A1 | 4/2017 | Schowengerdt et al. |
| 2017/0132757 A1 | 5/2017 | Thiebaud et al. |
| 2017/0192239 A1 | 7/2017 | Nakamura et al. |
| 2017/0227764 A1 | 8/2017 | Kim et al. |
| 2017/0242249 A1 | 8/2017 | Wall |
| 2017/0248790 A1 | 8/2017 | Cheng |
| 2017/0299860 A1 | 10/2017 | Wall et al. |
| 2017/0336636 A1 | 11/2017 | Amitai et al. |
| 2017/0343822 A1 | 11/2017 | Border et al. |
| 2017/0363799 A1 | 12/2017 | Ofir et al. |
| 2018/0003862 A1 | 1/2018 | Benitez |
| 2018/0067315 A1* | 3/2018 | Amitai ................ G02B 6/0035 |
| 2018/0101087 A1 | 4/2018 | Shinohara |
| 2018/0210202 A1 | 7/2018 | Danziger |
| 2018/0275346 A1 | 9/2018 | Li et al. |
| 2018/0292592 A1 | 10/2018 | Danziger |
| 2018/0292599 A1 | 10/2018 | Ofir et al. |
| 2018/0341223 A1 | 11/2018 | Shestak et al. |
| 2018/0372940 A1 | 12/2018 | Ishii et al. |
| 2018/0373115 A1 | 12/2018 | Brown et al. |
| 2019/0037712 A1 | 1/2019 | Kim et al. |
| 2019/0037718 A1 | 1/2019 | Shapiro et al. |
| 2019/0056600 A1 | 2/2019 | Danziger et al. |
| 2019/0086674 A1 | 3/2019 | Sinay et al. |
| 2019/0159354 A1 | 5/2019 | Zheng et al. |
| 2019/0187482 A1 | 6/2019 | Lanman et al. |
| 2019/0212487 A1 | 7/2019 | Danziger et al. |
| 2019/0222830 A1 | 7/2019 | Edwin et al. |
| 2019/0227215 A1 | 7/2019 | Danziger et al. |
| 2019/0304951 A1 | 10/2019 | Nakamura et al. |
| 2020/0027855 A1 | 1/2020 | Lee et al. |
| 2020/0120329 A1 | 4/2020 | Danziger |
| 2020/0241308 A1 | 7/2020 | Danziger et al. |
| 2020/0261279 A1 | 8/2020 | Weidman et al. |
| 2020/0278547 A1 | 9/2020 | Singer |
| 2020/0292819 A1 | 9/2020 | Danziger et al. |
| 2020/0349902 A1 | 11/2020 | Machida |
| 2020/0355924 A1 | 11/2020 | Dobschal |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |

(56) References Cited

U.S. PATENT DOCUMENTS

| | | |
|---|---|---|
| 2021/0080637 A1 | 3/2021 | Brick et al. |
| 2021/0099691 A1 | 4/2021 | Danziger |
| 2022/0018760 A1 | 1/2022 | Spartz et al. |
| 2022/0035758 A1 | 2/2022 | Hanna et al. |

FOREIGN PATENT DOCUMENTS

| | | |
|---|---|---|
| CN | 107238928 | 10/2017 |
| CN | 207424391 U | 5/2018 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 1485692 A | 6/1967 |
| FR | 2496905 | 6/1982 |
| FR | 2617562 | 1/1989 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | 2001021448 | 1/2001 |
| JP | 2002539498 | 11/2002 |
| JP | 2003140081 | 5/2003 |
| JP | 2003337298 A | 11/2003 |
| JP | 2003536102 | 12/2003 |
| JP | 2004527801 | 9/2004 |
| JP | 2005084522 | 3/2005 |
| JP | 2006003872 | 1/2006 |
| JP | 2006145644 A | 6/2006 |
| JP | 2007505353 A | 3/2007 |
| JP | 2010217906 A | 9/2010 |
| JP | 2012123936 A | 6/2012 |
| JP | 2014506340 A | 3/2014 |
| JP | 2016028275 A | 2/2016 |
| JP | 2016197830 A | 11/2016 |
| JP | 2017135605 A | 8/2017 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 12088478 A1 | 6/2012 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

OTHER PUBLICATIONS

Petros I Stavroulakis et al: "Suppression of backscattered diffraction from sub-wavelenght "moth-eye" arrays References and Links / Optics Express 1", Endeavour Nanotechnology Zoolog. Sci. Philos. Trans. J. Mod. Opt. Appl. Opt. Opt. Acta (Lond.) Appl. Opt. Appl. Opt. Opt. Lett. Jpn. J. Appl. Pjys. J. Ceram. Soc. Jpn. Opt. Commun. App;. Opt. Opt. Lett. Nanotechno, Jan. 1, 1967, pp. 79-84.

Chin-Hao Chang et al: "Nanostrutured gradient-index antireflection diffractive optics", Optics Letters, vol. 36, No. 12, Jun. 15, 2011, p. 2354.

Qiaoyin Yang et al: "Antireflection effects at nanostructured material interfaces and the suppression of thin-film interference", Nanotechnology, vol. 24, No. 23, May 15, 2013, p. 235202.

Hemant Kumar Raut et al: "Anti-reflective coatings: A critical, in-depth review", Energy & Environmental Science, vol. 4, No. 10, Jan. 1, 2011, p. 3779.

R. J. Weiblen et al: "Optimized moth-eye anti-reflective structures for $As_2S_3$ chalcogentide optical fibers", Optics Express, vol. 24, No. 10, May 2, 2016 p. 10172.

C.B. Owen et al "Display-relative calibration for optical see-through head-mounted displays" Published in: Third IEEE and ACM International Symposium on Mixed and Augmented Reality—https://ieeexplore.ieee.org/document/1383044.

Mukawa H "A full-color eyewear display using planar waveguides with reflection volume holograms" , Article in Information Display • Mar. 2009 DOI: 10.1002/j.2637-496X.2009.tb00066.x.

Da-Yong et al., "A Continuous Membrane Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

APPARATUS AND METHODS FOR EYE TRACKING BASED ON EYE IMAGING VIA LIGHT-GUIDE OPTICAL ELEMENT

CROSS-REFERENCE TO RELATED APPLICATIONS

This application claims priority from U.S. Provisional Patent Application No. 62/867,249, filed Jun. 27, 2019, and U.S. Provisional Patent Application No. 62/869,582, filed Jul. 2, 2019, whose disclosures are incorporated by reference in their entireties herein.

TECHNICAL FIELD

The present invention relates to eye tracking.

BACKGROUND OF THE INVENTION

Optical arrangements for near eye display (NED), head mounted display (HMD) and head up display (HUD) require large aperture to cover the area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred herein as a light-guide optical element (LOE), light transmitting substrate, or waveguide. The principles of such aperture multiplication are illustrated schematically in FIG. 1, which shows a light-guide optical element 20 having a pair of parallel faces 26, 26A for guiding light by internal reflection. A projected image 18, as represented here schematically by a beam of illumination 18 including sample rays 18A and 18B which span the beam, is coupled into the light-guide optical element 20, as illustrated here schematically by a first reflecting surface 16, so as to generate reflected rays 28 which are trapped by internal reflection within the substrate, generating also rays 30. The image propagates along the substrate by repeated internal reflection, impinging on a sequence of partially reflecting surfaces 22 at an oblique angle ($\alpha_{sur}$) to the parallel faces 26, 26A, where part of the image intensity is reflected so as to be coupled out of the substrate as rays 32A, 32B toward the eye 24 of an observer. In order to minimize unwanted reflections which might give rise to ghost images, the partially reflecting surfaces 22 are preferably coated so as to have low reflectance for a first range of incident angles, while having the desired partial reflectivity for a second range of incident angles, where a ray with a small inclination to the normal to a partially reflective surface 22 (represented here as angle $\beta_{ref}$) is split in order to generate a reflected ray for coupling out, while a high inclination (to the normal) ray is transmitted with negligible reflection.

The projected image 18 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled in to the substrate with a corresponding range of angles, and similarly coupled out at corresponding angles, thereby creating a field of view corresponding to parts of the image arriving in different directions to the eye 24 of the observer.

An optical function which could be useful for NED, HMD or HUD designs is eye tracking, or sensing the direction the eye of the observer is looking relative to the direction of the head (commonly referred to as the gaze direction). Past eye tracking approaches relied on imaging the EMB via one or more off-axis cameras looking from the side toward the EMB. In order to reduce user discomfort, the cameras should be of relatively small size, which can limit the EMB imaging performance. The small camera size, together with the general difficulty of deriving the gaze direction from EMB images sampled at high off-axis angles, results in relatively low performance of such eye tracking approaches.

SUMMARY OF THE INVENTION

Aspects of the present invention provide an eye tracker and corresponding method for tracking the gaze direction of a human eye based on imaging the eye via a light-guide optical element, and are particularly suitable for integrating as part of a NED, HMD or HUD.

According to the teachings of an embodiment of the present invention, there is provided an apparatus that comprises: a light-transmitting substrate having at least two parallel major surfaces for guiding light by internal reflection, a first of the major surfaces being deployed in facing relation to an eye; an optical element associated with the first of the major surfaces, the optical element configured for applying optical power to incident light in accordance with at least one property of the incident light, such that the optical element applies optical power to incident light of a first type so as to collimate the incident light of the first type and such that the optical element applies substantially no optical power to incident light of a second type; an optical coupling configuration associated with the substrate and configured for: coupling-in a proportion of light of the first type, collimated by the optical element and incident on the first of the major surfaces, so as to propagate within the substrate, and coupling-out a proportion of light of the second type propagating within the substrate; optics associated with the substrate and configured for converting the collimated light of the first type into converging beams of captured light; an optical sensor deployed for sensing the captured light; and at least one processor electrically associated with the optical sensor and configured to process signals from the optical sensor to derive a current gaze direction of the eye.

Optionally, the at least one property of the incident light includes a polarization direction of the incident light.

Optionally, the at least one property of the incident light includes a region of the electromagnetic spectrum occupied by the incident light.

Optionally, the at least one property of the incident light includes a polarization direction of the incident light and a region of the electromagnetic spectrum occupied by the incident light.

Optionally, the light of the first type includes components of light that are polarized in a first polarization direction, and wherein the light of the second type is polarized in a second polarization direction.

Optionally, the light of the first type is within a first optical spectrum, and wherein the light of the second type is within a second optical spectrum.

Optionally, the light of the first type includes components of light that are polarized in a first polarization direction and is within a first optical spectrum, and wherein the light of the second type is polarized in a second polarization direction and is within a second optical spectrum.

Optionally, the apparatus further comprises: a polarizer associated with a second of the major surfaces of the substrate.

Optionally, the substrate is deployed with the first of the major surfaces at an eye relief distance from the eye, and wherein the optical element has a focal length approximately equal to the eye relief distance.

Optionally, the apparatus further comprises: a second optical coupling configuration associated with the optics and configured for: coupling-out a proportion of light of the first type propagating within the substrate such that the coupled-out light is received by the optics, and coupling-in a proportion of light of the second type, from a display source, so as to propagate within the substrate by internal reflection.

Optionally, the apparatus further comprises: an illumination arrangement deployed to illuminate the eye with light of the first type.

Optionally, the apparatus further comprises: an image projector coupled to the substrate so as to introduce collimated light of the second type corresponding to an image into the substrate such that the coupled-in collimated light of the second type propagates by internal reflection within the substrate and is coupled out of the substrate toward the eye by the optical coupling configuration.

Optionally, the image projector includes a reflective-display device that produces polarized light in response to illumination from a polarized source of light, and wherein the polarized light produced by the reflective-display device is collimated by the optics.

Optionally, the optical coupling configuration includes a plurality of partially reflective surfaces deployed within the substrate obliquely to the major surfaces of the substrate.

Optionally, light of the first type propagates within the substrate in a first propagation direction, and wherein light of the second type propagates within the substrate in a second propagation direction opposite the first propagation direction.

There is also provided according to an embodiment of the teachings of the present invention an apparatus that comprises: a light-transmitting substrate having a pair of parallel major surfaces for guiding light by internal reflection, a first of the major surfaces being deployed in facing relation to an eye of a viewer; a lens associated with the first of the major surfaces, the lens configured for: applying optical power to incident light of a first type so as to collimate the incident light of the first type, wherein the incident light of the first type is within a first optical spectrum and includes components of light that has polarization in a first polarization direction, and applying substantially no optical power to incident light of a second type, wherein the incident light of the second type is within a second optical spectrum and has polarization in a second polarization direction; an illumination arrangement deployed to illuminate the eye with light of the first type such that a proportion of the light of the first type is reflected by the eye back toward the lens so as to be collimated by the lens; an optical module including: a reflective-display device that produces light of the second type, corresponding to an image, in response to illumination from a source of light, optics configured for collimating the light produced by the reflective-display device so as to produce collimated light of the second type, and an optical sensor; an optical coupling configuration configured for coupling the collimated light of the second type into the substrate so as to propagate within the substrate by internal reflection in a first propagation direction; a plurality of partially reflective surface deployed within the substrate obliquely to the major surfaces of the substrate, the partially reflective surfaces configured for: coupling-out a proportion of light of the second type, propagating within the substrate in the first propagation direction, and coupling-in a proportion of the collimated light of the first type incident on the first of the major surfaces, so as to propagate within the substrate in a second propagation direction, wherein the optical coupling configuration is further configured for coupling-out the propagating light of the first type; and at least one processor electrically coupled to the optical sensor, wherein the optics of the optical module are further configured for receiving the light coupled-out by the optical coupling configuration and for converting the coupled-out light into converging beams of captured light, and wherein the optical sensor is configured for sensing the captured light, and wherein the at least one processor is configured to process signals from the optical sensor to derive a current gaze direction of the eye.

There is also provided according to an embodiment of the teachings of the present invention an apparatus that comprises: a first light-transmitting substrate having at least two substantially parallel major surfaces for guiding light by internal reflection, a first of the major surfaces being deployed in facing relation to an eye of a viewer; an at least partially reflective surface deployed within the first substrate obliquely to the major surfaces, the at least partially reflective surface configured to couple incident light rays that are incident on the first of the major surfaces within a coupling-in region so as to propagate within the first substrate by internal reflection, wherein the incident light rays are in a first optical spectrum and emanate from the eye in response to illumination of the eye, and wherein the incident light rays include at least a first set of light rays and a second set of light rays, the first set of light rays having an angular distribution spanning at least a portion of the coupling-in region in a first dimension, and the second set of light rays spanning at least a portion of the coupling-in region in a second dimension; a coupling-out arrangement configured for coupling-out the light rays propagating within the first substrate; an optical module including: at least one lens having a first focal length in a first dimension of the lens and a second focal length in a second dimension of the lens, and configured for: converting the coupled-out light rays corresponding to the first set of light rays into non-converging beams of captured light having an angular distribution indicative of the angular distribution of the first set of light rays, and converting the coupled-out light rays corresponding to the second set of light rays into converging beams of captured light, and an optical sensor positioned at a distance from the lens substantially equal to the first focal length and configured for sensing the captured light; and at least one processor electrically coupled to the optical sensor configured to process signals from the optical sensor to derive a current gaze direction of the eye.

Optionally, the apparatus further comprises: an illumination arrangement deployed to illuminate the eye with light in the first optical spectrum Optionally, the apparatus further comprises: a second light-transmitting substrate having a plurality of surfaces including mutually parallel first and second major surfaces for guiding light by internal reflection, the first major surface of the second substrate being deployed in facing relation to the eye, and the second major surface of the second substrate being deployed in facing relation to the first of the major surfaces of the first substrate; and a coupling-out configuration associated with the second substrate, the coupling-out configuration configured to couple a proportion of light in a second optical spectrum, different from the first optical spectrum and propagating within the second substrate, out of the second substrate toward the eye.

Optionally, the apparatus further comprises: an image projector coupled to the second substrate and configured to generate collimated light in the second optical spectrum corresponding to an image such that the collimated light propagates by internal reflection within the second substrate and is coupled out of the second substrate toward the eye by the coupling-out configuration.

Optionally, the apparatus further comprises: a coupling-in arrangement associated with the image projector and the second substrate configured to couple the collimated light generated by the image projector into the second substrate.

Optionally, the coupling-out configuration includes a plurality of partially reflective surfaces deployed within the second substrate obliquely to the major surfaces of the second substrate.

Optionally, the coupling-out configuration includes a diffractive optical element associated with one of the major surfaces of the second substrate.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
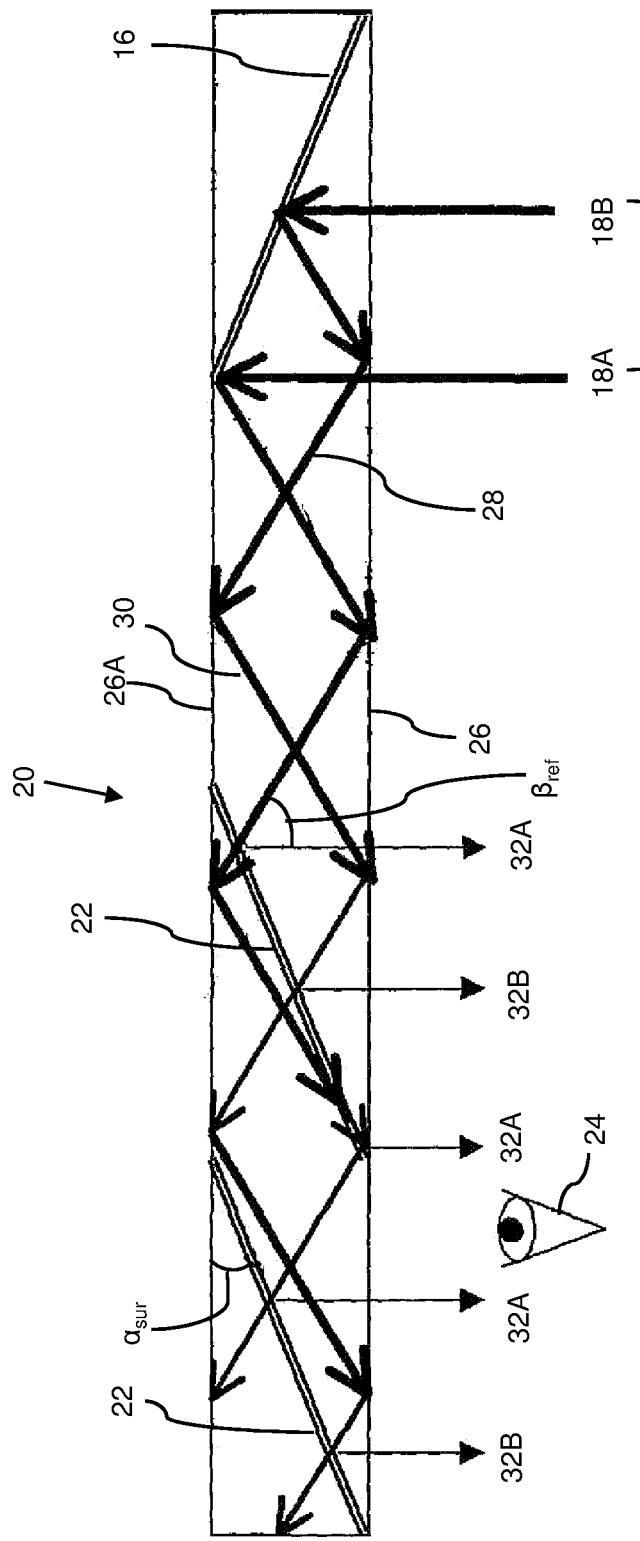
FIG. 1 is a schematic side view, described above, of a prior art light-guide optical element employing partially-reflective surfaces, for use in a near-eye display.

Embodiments of the present invention provide various apparatus and corresponding methods for tracking the gaze direction of a human eye based on imaging the eye and/or identifying an angular distribution of light reflected by the eye via a light-guide optical element.

The principles and operation of the various eye tracking apparatus according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

By way of introduction, in many applications, particularly in the context of head-up or near-eye displays, it is useful to provide an eye tracking arrangement for determining the gaze direction of the user. One common approach for performing eye tracking is to sample an image of the eye, typically for the purpose of determining the pupil position within the image, and thereby deriving the orientation of the eye. It would be particularly advantageous to employ a light-guide optical element operating on principles similar to those of FIG. 1 to sample images for eye tracking.

Eye tracking solutions employing a light-guide optical element operating on such principles or similar such principles are described herein. In one set of solutions according to certain aspects of the present invention, the eye is imaged by way of coupling light, reflected from the eye (referred to as light of a first type), back into the light-guide optical element, whereby the light propagates along a reverse path through the light-guide optical element, in a reverse propagation direction of image light from an image projector (referred to as light of a second type), and is focused onto an optical sensor deployed in the image projector, where signals produced by the optical sensor, in response to sensing the light, are processed by a processing system to derive the gaze direction. Since the eye is not located at infinity from the light-guide optical element (but rather at an eye relief distance, typically on the order of approximately 20 millimeters), the light reflected from the eye is collimated by an optical element, preferably a polarization and/or spectrally selective lens that discriminates between the light of the first and second types, prior to being coupled into the light-guide optical element in order to accurately derive the gaze direction from the light focused on the optical sensor.

In another set of solutions according to aspects of the present invention, the gaze direction is determined by way of a specialized partially-reflective surface, preferably in a dedicated light-guide optical element separate from the LOE through which the projected image propagates, which couples uncollimated light, reflected from the eye, into the light-guide optical element, whereby the coupled-in in light propagates along a reverse path through the light-guide optical element and is coupled out to an optical module that includes a lens having two focal lengths in respective orthogonal dimensions which directs the coupled-out light to an optical sensor.

Referring now to the drawings, FIGS. 2-8 illustrate various aspects of the structure and operation of an apparatus, generally designated 100, constructed and operative according to various embodiments of the present invention, for displaying an image and for deriving a gaze direction of a human eye 110 by way of a collimating optical element 112 (referred to herein after as lens 112) deployed between the eye 110 and a light-guide optical element (LOE) 102. The LOE 102 is formed from transparent material and has a pair of parallel faces (planar major surfaces) 104, 106 for guiding light by internal reflection (preferably total internal reflection). The LOE 102 is deployed with one of the parallel faces 104 in facing relation to the eye 110, where the eye 110 is located in the EMB 109 at an eye relief (ER) distance 111 from the face 104. An optical coupling configuration, implemented as a set of partially reflective surfaces 108, is associated with the LOE 102 and is configured for coupling-in a proportion of light incident on the face 104 within a coupling-in region so as to propagate within the LOE 102 by (total) internal reflection. In particular, the partially reflective surfaces 108 are deployed within the LOE 102 (i.e., between the faces 104, 106) obliquely to the parallel faces 104, 106. The coupling-in region of the LOE 102, also referred to as the "active region" or "active area", is generally defined as the region spanned by the projection of the partially reflective surfaces 108 in the plane of the face 104.

The lens 112 is associated with the face 104 (by way of optical attachment to the LOE 102) such that the lens 112 is positioned between the LOE 102 and the eye 110. The lens 112 preferably has a focal length approximately equal to the ER 111. Light reflected from the eye 110 (in response to illumination of the eye 110 by an illumination arrangement 138) is collimated by the lens 112 whereupon the collimated light is incident on the face 104 and is coupled into to the LOE 102 by the partially reflective surfaces 108 so as to propagate within the LOE 102 by internal reflection. An optical element 140 (referred to hereinafter as lens 140) is associated with the LOE 102 so as to receive the captured light propagating within the LOE 102 and to convert collimated light (sets of parallel light rays) propagating within the LOE 102 into converging beams of captured light. Preferably, the lens 140 is integrated into an optical module 126 together with an optical sensor 128 which is configured for sensing the captured light, and the lens 140 is associated with the LOE 102 via an optical coupling configuration 124 that couples the captured light propagating within the LOE 102 out of the LOE 102 to the optical module 126. A processing system 130, that includes at least one computerized processor 132 coupled to a storage medium 134 (such as a computer memory or the like), is electrically associated with the optical sensor 128, and is configured to process signals from the optical sensor 128 to derive a current gaze direction of the eye 110.

The optical coupling configuration 124 may be any coupling arrangement which deflects incident light out of the LOE 102 and into the optical module 126. Suitable optical coupling configurations include, but are not limited to, a reflecting surface (as shown schematically in FIG. 2) and a prism (as shown schematically in FIG. 3).

Generally speaking, the eye 110 is illuminated with light by the illumination arrangement 138. As will be discussed, the illumination arrangement 138 is configured to illuminate the eye 110 with light having wavelengths outside of the photopic region of the electromagnetic spectrum. In other words, the illumination arrangement 138 is configured to illuminate the eye 110 with light that is not visible to the human eye. Reflection from the human eye, and in particular reflection from the retina of the eye, is substantially higher in the near infrared than at visible wavelengths. Accordingly, it is preferable that the illumination arrangement 138 is configured to illuminate the eye 110 with light having wavelengths in the near infrared (NIR) region of the electromagnetic spectrum. In addition, and as will be discussed in detail in subsequent sections of the present disclosure, the illumination arrangement 138 is also preferably configured to illuminate the eye 110 such that the light reflected by eye 110 in response to illumination from the illumination arrangement 138 includes at least components of light having a particular polarization direction (typically p-polarized) relative to the surface of the lens 112.

Figure 2:
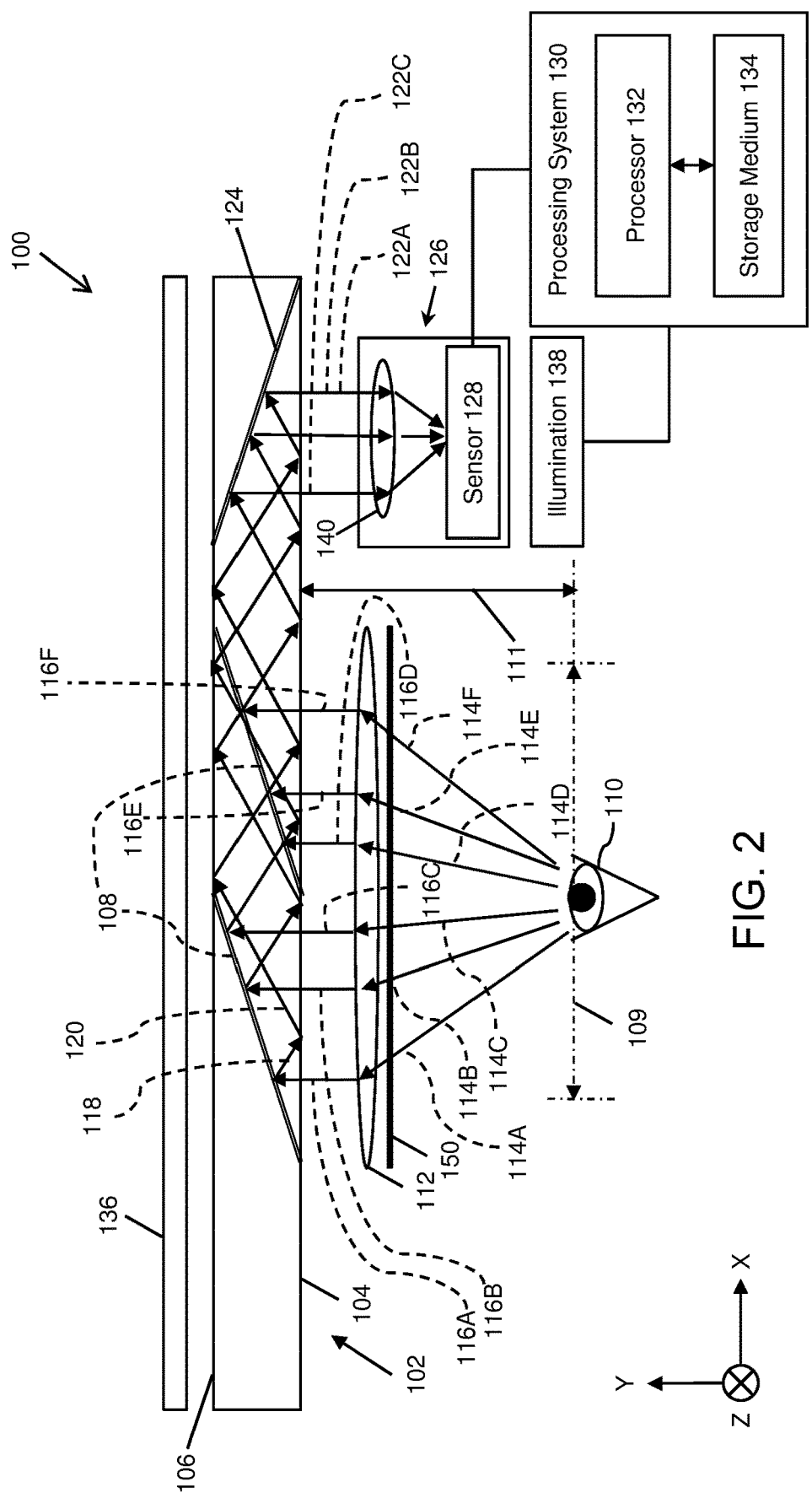
FIG. 2 is a schematic side view of an apparatus, constructed and operative according to an embodiment of the present invention, for displaying an image and for tracking the gaze direction of a human eye, showing the propagation of light from the eye to an image projector via a light-transmitting substrate.
Figure 3:
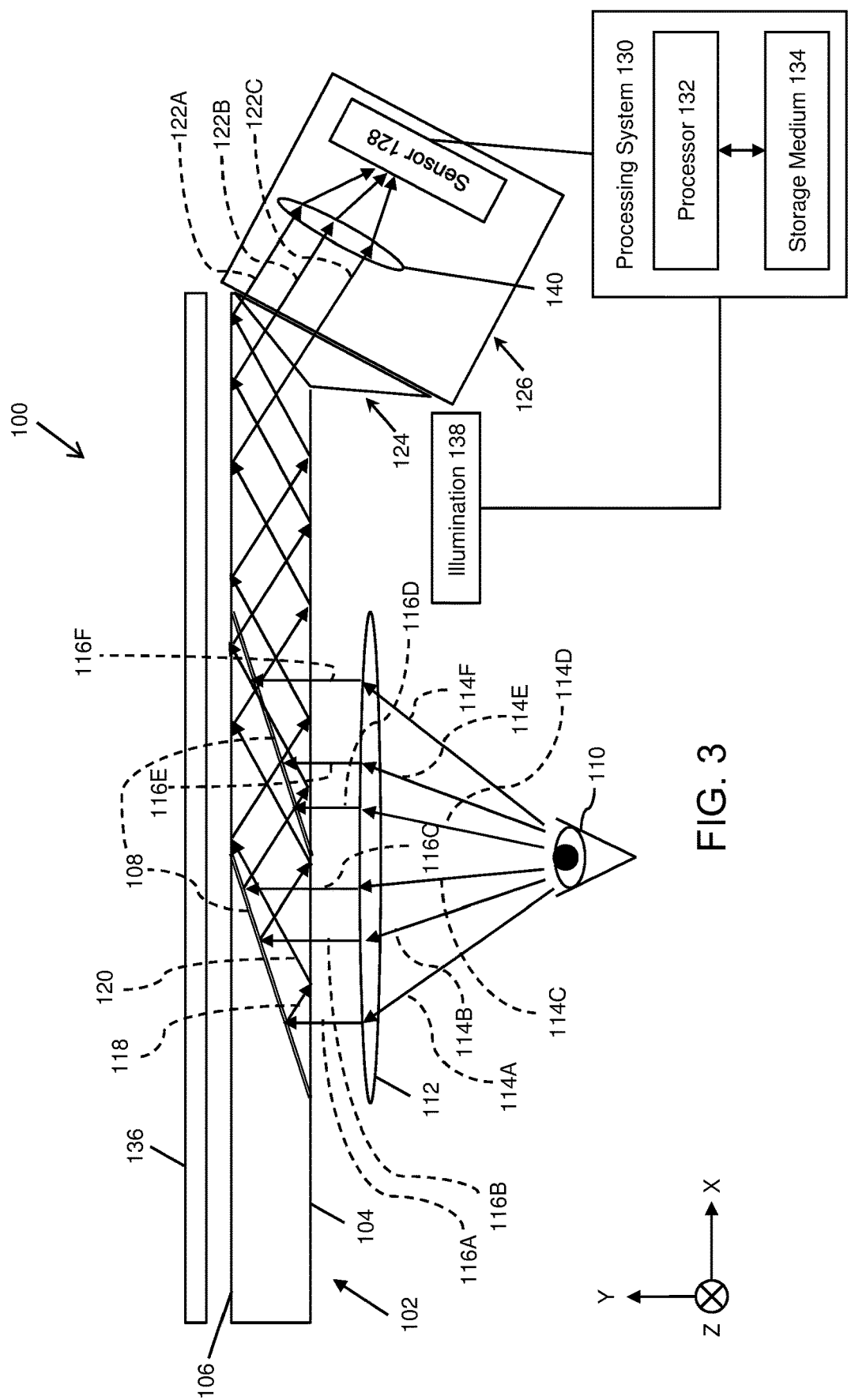
FIG. 3 is a schematic side view of an alternate construction of the apparatus of FIG. 2, in which an optical coupling configuration for coupling light between the light-transmitting substrate and the image projector is implemented as a reflective surface.

Referring now specifically to FIGS. 2 and 3, this shows the traversal of light rays from the eye 110 to the optical sensor 128 via the LOE 102. In general, light propagating within the LOE 102 from the eye 110 to the optical sensor 128 is referred to as propagating within the LOE 102 in a reverse propagation direction (referred to interchangeably as a first/second propagation direction, first/second direction, or reverse direction), whereas image light propagating within the LOE 102 from the image projector to the eye 110 is referred to as propagating within the LOE 102 in a forward propagation direction (referred to interchangeably as a second/first propagation direction, second/first direction, or forward direction) opposite the reverse propagation direction. A proportion of the intensity of the light from the illumination arrangement 138 incident on the eye 110 is reflected by the eye 110. The reflected light emanating from the eye 110 is schematically represented in FIGS. 2 and 3 as sample light rays 114A-114F. Light emanating from the eye 110 is collimated by the lens 112, where the collimated light is schematically represented as light rays 116A-116F (each of the respective light rays 114A-114F has a corresponding collimated light ray 116A-116F). The collimated light rays 116A-116F are incident on the face 104 of the LOE 102 generally normal to the face 104, and are coupled into the LOE 102 by the partially reflective surfaces 108 so as to generate reflected rays 118 (down-going rays) which are trapped by internal reflection within the LOE 102, generating also (up-going) rays 120. The light reflected from the eye 110 propagates along the substrate until it reaches the optical coupling configuration 124 (shown schematically as a reflecting surface in FIG. 2 and as a prism in FIG. 3), which couples the light (light rays 118 and 120) out of the LOE 102 as light rays 122A, 122B, and 122C to the optical module 126. The lens 140 converts the collimated coupled-out light (rays 122A, 122B, and 122C) into converging beams of captured light so as to focus the coupled-out light (rays 122A, 122B, and 122C) onto the optical sensor 128.

The optical module 126, in addition to having the lens 140 and the optical sensor 128 integrated therein, preferably also includes components for generating and projecting the image into the LOE 102 for viewing by the eye 110 (similar to the projected image 18 in FIG. 1), such that the optical module 126 performs the dual functionality of image projection and light focusing and sensing. As will be discussed, the lens 140 also functions to collimate light rays produced by a display device of the optical module 126.

Figure 4:
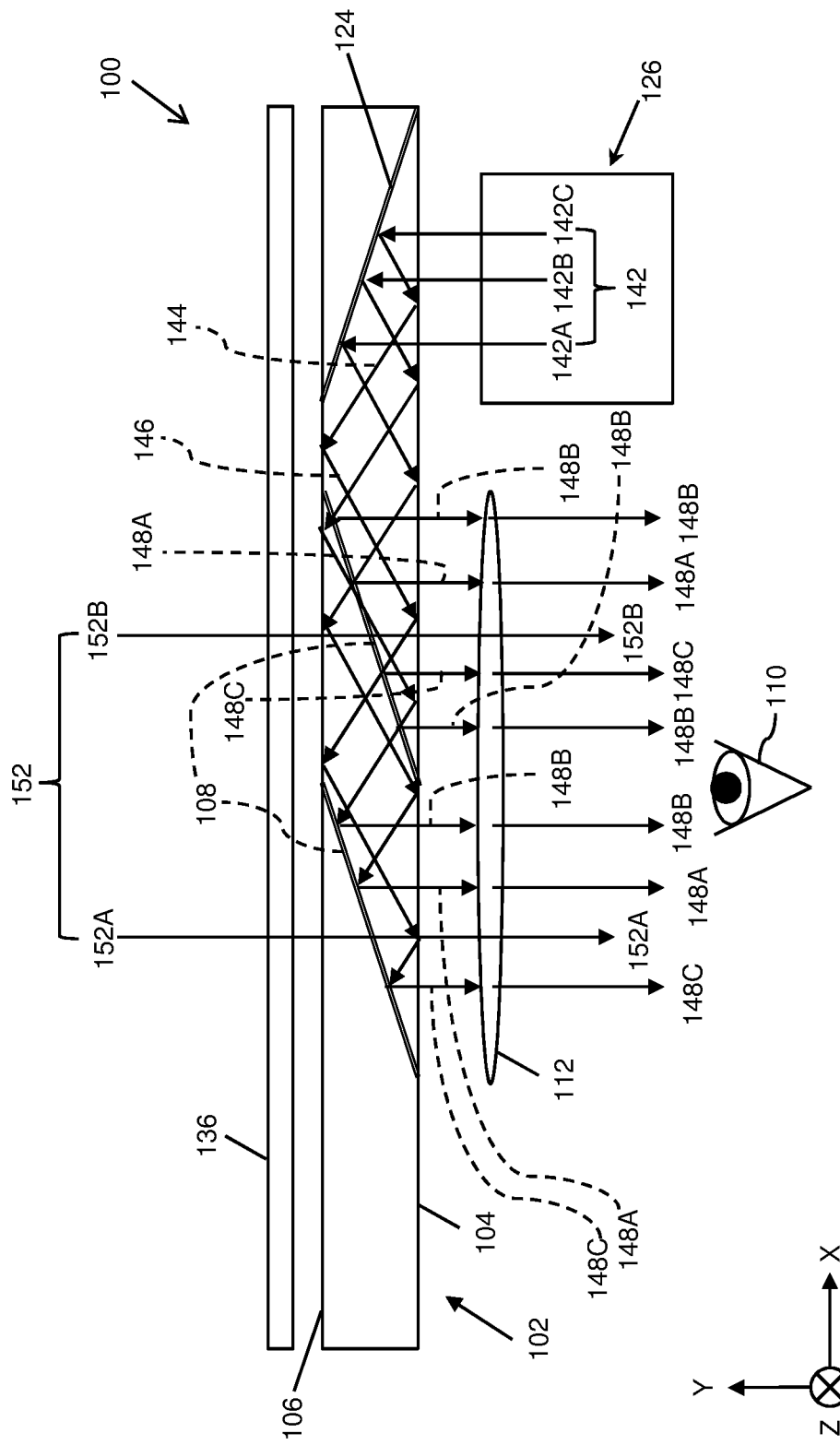
FIG. 4 is a schematic side view of the apparatus of FIG. 2, showing the propagation of image light from the image projector, and the propagation of light of an external scene, to the eye.

Referring now to FIG. 4, this shows the propagation of light within the LOE 102 in the forward direction. Similar to as in FIG. 1, a projected image 142, as represented here schematically by a beam of illumination 142 including sample rays 142A, 142B, and 142C which span the beam, is generated by the optical module 126 and is coupled into the LOE 102 via the optical coupling configuration 124 (as illustrated here schematically by a reflecting surface) so as to generate reflected rays 144 (up-going rays) which are trapped by internal reflection within the LOE 102, generating also rays 146 (down-going rays). The image 142 propagates along the LOE 102 by repeated internal reflection between the faces 104, 106, impinging the partially reflecting surfaces 108 where part of the image intensity is reflected so as to be coupled out of the LOE 102 as rays 148A, 148B, and 148C toward the eye 110. However, prior to reaching the eye 110, the light rays 148A-148C necessarily pass through the lens 112.

While it is critical for the lens 112 to apply optical power to light emanating from the eye 110 so as to collimate the light rays 114A-114F in order to enable accurate sensing of the captured light (by the optical sensor 128) and processing (by the processing system 130) of the signals from the optical sensor 128 to derive a current gaze direction of the eye 110, it is equally critical that the lens 112 applies no optical power to the image light propagating from the optical module 126 to the eye 110 via the LOE 102 as the application of optical power to the light rays 148A, 148B, and 148C would distort the projected image 142 when viewed by the eye 110. Therefore, it is a particular feature of the present embodiments to design the lens 112 such that the lens can discriminate between two types of light (light reflected from the eye, represented by light rays 114A-114F, that propagates via the LOE 102 to the focusing and sensing components of the optical module 126, referred to as light of a first type, and image light from the image projection components of the optical module 126, represented by light rays 142A-142C, referred to as light of a second type), and apply optical power to only one of those types of light (namely the light of the first type, i.e., the reflected eye light). Within the context of this document, the terms "light of the first type", "light waves of the first type", "first type of light", "first type of light waves", and variations thereof are used interchangeably. Also, within the context of this document, the terms "light of the second type", "light waves of the second type", "second type of light", "second type of light waves", and variations thereof, are used interchangeably.

According to certain preferred embodiments, the discrimination is performed based on at least one property of the light that is incident on the lens 112. In other words, the lens 112 is designed such that the lens 112 selectively applies optical power to incident light in accordance with at least one property (feature) of the incident light. In certain embodiments, one property—for example the wavelength (i.e., the optical spectrum) of the incident light—is used as a basis to discriminate between the first and second types of light, while in other embodiments another property—for example the polarization direction or polarization direction of components of the incident light—is used as a basis to discriminate between the first and second types of light, while yet in other preferred embodiments both the optical spectrum (wavelength) and the polarization direction of the incident light is used as a basis to discriminate between the first and second types of light.

It is generally noted that in contrast to the light that illuminates the eye 110, the image light 142 (light of the second type) has wavelengths in the photopic region of the electromagnetic spectrum (i.e., between 380 nanometers (nm) and approximately 700 nm). Therefore, the lens 112 can be designed in a way such that optical power is only applied to light having wavelengths outside of the photopic region of the electromagnetic spectrum. In addition, in many applications it is preferable that the image light projected by the optical module 126 is linearly polarized in a specific polarization direction (preferably s-polarized). As such, the lens 112 may be designed such that the lens 112 applies optical power to polarized light having a polarization direction rotated with respect to the polarization direction of the coupled-out image light projected by the optical module 126. Accordingly, the lens 112 is preferably designed to be polarization and spectrally selective such that optical power is applied to incident light waves of the first type so as to collimate the incident light waves of the first type, and such that the lens 112 does not apply optical power to incident light waves of the second type, and in which the incident light waves of the first type have components in a first polarization direction (e.g., p-polarized) and have wavelength in a first optical spectrum (e.g., the NIR region of the electromagnetic spectrum), and in which the incident light waves of the second type have a second polarization direction rotated relative to the first polarization direction (e.g., s-polarized) and have wavelength in a second optical spectrum (e.g., the photopic (or visible light) region of the electromagnetic spectrum). To this end, for the first type of incident light waves, the lens 112 has a focal length approximately equal to the ER 111.

In the aforementioned example configuration of the lens 112, the light rays 114A-114F (the first type of light) represent the p-polarized (relative to the surface of the lens 112) components of the light emanating from the eye 110 and have wavelengths in the NIR region of the electromagnetic spectrum, whereas the light rays 148A-148C (the light of the second type) that are coupled-out from the LOE 102 are s-polarized (relative to the surface of the lens 112) and have wavelengths in the visible region of the electromagnetic spectrum. As a result of the polarization and wavelength dependent optical power discrimination performed by the lens 112, the lens 112 applies optical power to p-polarized NIR light waves so as to collimate the light rays 116A-116F (the first type of light), and does not apply optical power to the s-polarized visible image light waves coupled-out of the LOE 102 such that the light rays 148A-148C (the second type of light) coupled out of the LOE 102 (by the partially reflective surfaces 108) pass through the lens 112 without being distorted by the lens 112. Furthermore, the lens 112 does not apply optical power to any s-polarized components of the NIR light reflected from the eye 110.

One particular class of materials that exhibit birefringent (polarization) and/or spectral properties are liquid crystals, which have different effects on light of different polarizations and in certain instances difference wavelengths. For example, nematic phase liquid crystal molecules react differently to incident light of two different linear polarizations (s-polarization and p-polarization). In an exemplary but non-limiting implementation, the lens 112 is implemented as a nematic phase liquid crystal lens composed of layers of liquid crystal material. The layers of liquid crystal material assume a state which provides a tunable focal length whereby the lens 112 has a prescribed focal length for polarized light in one polarization direction (e.g., p-polarized) so as to act as a collimator for that light, and the lens 112 applies no optical power to light of the orthogonal polarization (e.g., s-polarized). Each liquid crystal molecule in nematic phase liquid crystals has a different susceptibility to each linear polarization, and hence a different refractive index of the liquid crystal molecule can be induced. As such, incident light in one polarization direction "sees" no change in refractive index, whereas the incident light in the other polarization will "see" a change in refractive index thereby inducing a lens effect for light of that polarization. In twisted nematic liquid crystals, each liquid crystal molecule has a different susceptibility to each circular polarization (e.g., right-hand circular polarization (or RHP), and left-hand circular polarization (or LHP)). Typically, the susceptibility for twisted nematic liquid crystals is such that for RHP a positive power lensing effect is induced, while for LHP a negative power lensing effect is induced. Introducing another isotropic lens with the same focal length induced by the liquid crystal lens 112 can double the optical power for one polarization and yield no optical power for the other polarization. It is noted since optical power is applied differently to RHP and LHP light, a quarter wave plate 150 is preferably deployed between the eye 110 and the lens 112 to properly rotate the circular polarization direction of the reflected light from the eye 110.

Lenses constructed from liquid crystal materials are generally composed from thin diffractive-grating-type structures (similar to as in Fresnel lenses) which create diffractive dispersion of incident light. Each grating can be designed to have a larger intensity for a specific order of diffraction of that grating. The high intensity for that specific order of diffraction is chromatic (i.e., wavelength dependent). Therefore, the gratings can be designed such that for wavelengths in the NIR region, the relative intensity of $1^{st}$ or higher nodes of diffraction are higher than the intensity of the $0^{th}$ node of diffraction. In the photopic region, the high order nodes should have small intensity or no intensity at all. The grating orientation is spatially varied such that the above conditions for light in the NIR and photopic regions are satisfied, thereby creating a lensing effect, such that the lens 112 effectively collimates the light, and incident light having wavelength in a second optical spectrum (e.g., the photopic (or visible light) region of the electromagnetic spectrum) is essentially unaffected by the lens 112. It is noted that here the grating orientation of the liquid crystal molecules are changed so as to spatially change the refractive index of the liquid crystal molecule without exploiting the birefringent properties of the liquid crystal material.

In general, the lens 112 may be designed to discriminate based on a combination of wavelength and polarization. However, if the spectral separation between the first and second optical spectra is large enough without adversely affecting the light from the image projector, the discrimination between the first and second types of light based solely on wavelength could be sufficient. Generally speaking, the effect of the lens 112 on light from image projector can be evaluated based on one or more image quality metrics, including, for example, MTF, haze, checkerboard contrast, and the like.

It is noted that the apparatus 100 of the present disclosure are particularly applicable when used in augmented reality (AR) systems, where the image projected by the optical module 126 is overlaid on the real-world scene viewable to the observer through the faces 104, 106 and the partially reflective surfaces 108. Accordingly, it is also preferable that the light waves from the real-world scene that pass through the faces 104, 106 of the LOE 102 are not distorted by the lens 112 before reaching the eye 110. To prevent the light waves from the real-world scene from being distorted by the lens 112, a polarizer 136 that transmits only the components of incident light in the second polarization direction (e.g., s-polarized) is associated with the face 106. The polarizer 136 and the LOE 102 preferably have a common direction of elongation (illustrated arbitrarily herein as corresponding to the x-axis). Preferably, the polarizer 136 is deployed so as to extend across the entirety (or close to the entirety) of the face 106 such that the light from the entire real-world field of view (corresponding to a wide angular distribution of incoming light rays) is properly polarized by the polarizer 136 before impinging on the face 106.

The effect of the polarizer 136 on the real-world scene is illustrated schematically in FIG. 4. As illustrated, a real-world scene image 152, as represented here schematically by a beam of illumination 152 including sample rays 152A and 152B which span the beam, impinge on the polarizer 136, which transmits only the s-polarized light components of the light rays 152A and 152B. Since the light rays 152A and 152B are s-polarized and have wavelength in the photopic region, the s-polarized light rays 152A and 152B, similar to as with the light rays 148A-148C, pass through the lens 112 and reach the eye 110 without being distorted by the lens 112 (i.e., the lens 112 does not apply any optical power to the light rays 152A and 152B).

As discussed in the background section, in order to minimize unwanted reflections which might give rise to ghost images, the partially reflective surfaces are preferably coated so as to have low reflectance for a first range of incident angles, while having the desired partial reflectivity for a second range of incident angles. In the prior art configuration of FIG. 1, these coatings are typically specific to the wavelength range and polarization of the projected image. For example, if the projected image is composed of s-polarized light having wavelength in the photopic region of the electromagnetic spectrum, the partially reflective surfaces are coated so as to have low reflectance for s-polarized light in the photopic region at a first range of incident angles, while having the desired partial reflectivity for s-polarized light in the photopic region at a second range of incident angles. This coating scheme is ideal for the configuration of FIG. 1 since light only propagates in the forward direction and the partially reflective surfaces 22 are only used to couple light out of the LOE 20. However, in the configuration of FIGS. 2-4, in which a first type of light (p-polarized components of NIR light reflected from the eye 110) propagates in the reverse direction and a second type of light (s-polarized photopic light from the image projector) propagates in the forward direction and the partially reflective surfaces 108 are configured to couple the first type of light into the LOE 102 and couple the second type of light out of the LOE 102, a modified coating scheme should be followed to ensure the proper desired reflectivity for the first type of light. Specifically, the partially reflective surfaces 108 are preferably coated as in the configuration of FIG. 1 and additionally coated such that they have the desired reflectivity for p-polarized light in the NIR region at a prescribed range of incident angles.

As previously discussed, the optical module 126 performs a dual role of image projection and light focusing and sensing. The following paragraphs describe the structure and operation of the optical module 126 in its role as both an image projector for projecting the image 142, as well as a focusing and sensing arrangement for focusing the light reflected from the eye 110 onto the optical sensor 128.

Figure 5:
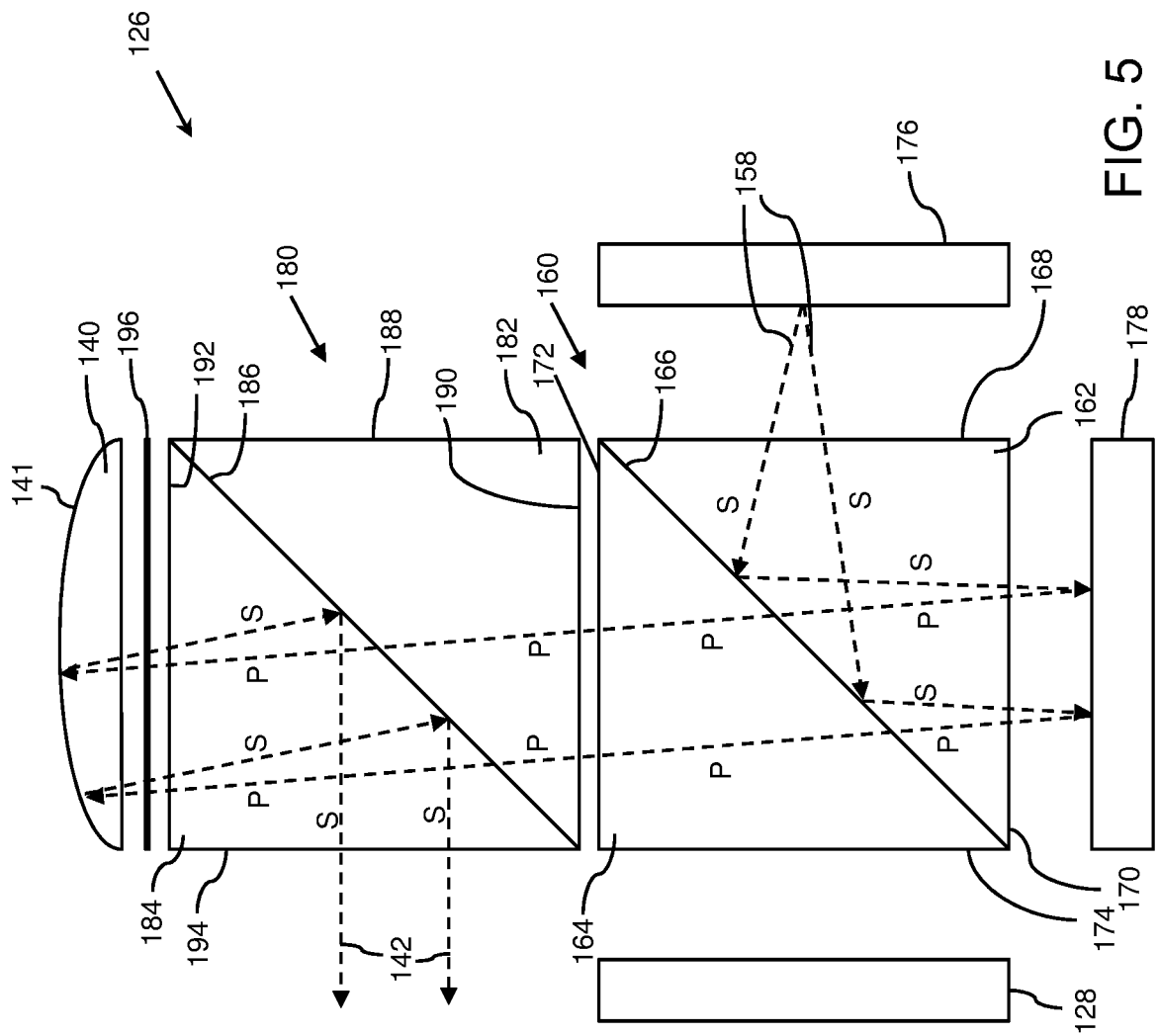
FIG. 5 is a schematic exploded plan view of the image projector of FIGS. 2-4, showing the propagation of image light to an output of the image projector.

Referring first to FIG. 5, the optical module 126 (also referred to as the image projector 126) includes an illumination prism 160 and a collimation-focusing prism 180, each formed from a light-wave transmitting material. The illumination prism 160 has a number of external surfaces including a light-wave entrance surface 168, an image display surface 170, a light-wave exit-and-entrance surface 172, and a light-wave exit surface 174. A polarization selective beamsplitter configuration 166 is deployed within the prism 160 on a plane oblique to the light-wave entrance surface 168. The prism 160 is based on two constituent prisms, namely a first constituent prism 162 and a second constituent prism 164, where at least one of the prisms 162, 164 is provided on the hypotenuse side with a polarizing beamsplitter (for example a wire grid beamsplitter) forming at least part of the polarization selective beamsplitter configuration 166, which reflects s-polarized light and transmits p-polarized light (incident to the surface of the beamsplitter). The two hypotenuse sides of the prisms 162, 164 are cemented to each other, to form a cemented unitary illumination prism assembly. This single cemented prism is used for illuminating a reflective-display device (for image projection) and also for directing the incoming light reflected from the eye 110 onto the optical sensor 128, which is associated with the light-wave exit surface 174. The polarizing beamsplitter can be provided via a polarization selective coating directly on one of the hypotenuse sides, or via a thin piece of material such as, for example, a sheet, foil, or glass plate, having a polarization selective coating deposited thereon, whereby the thin piece of material is attached to one of the hypotenuse sides.

In certain preferred implementations, the surfaces 170 and 172 are mutually parallel, and the surfaces 168 and 174 are mutually parallel. In certain particularly preferred implementations, the prism 160 is a cuboid prism, i.e., with rectangular faces orthogonal to each other, and in certain particularly preferred examples illustrated here, it is a square cuboid prism, where each constituent prism 162 and 164 has a 45-degree right-angled cross-sectional shape.

The collimation-focusing prism 180 also has a number of external surfaces including a first light-wave exit-and-entrance surface 190 (aligned with and parallel to the light-wave exit-and-entrance surface 172), a second light-wave exit-and-entrance surface 194, a collimation-focusing surface 192, and a fourth surface 188. A polarization-and-spectrally selective beamsplitter configuration 186 is deployed within the prism 180 on a plane oblique to the surface 188. As can be seen in FIG. 5, the beamsplitter configurations 166 and 186 are in parallel planes. The prism 180 is based on two constituent prisms, namely a first constituent prism 182 and a second constituent prism 184, where at least one of the prisms 182, 184 is provided on the hypotenuse side with a polarization-and-spectrally selective beamsplitter forming at least part of the polarization-and-spectrally selective beamsplitter configuration 186, which reflects p-polarized light and transmits s-polarized light having wavelengths in the first optical spectrum (e.g., NIR region) and reflects s-polarized light and transmits p-polarized light having wavelengths in the second optical spectrum (e.g., photopic (or visible light) region). The two hypotenuse sides of the prisms 182, 184 are cemented to each other, to form a cemented unitary collimation-focusing prism assembly. This single cemented prism is used for directing light from the reflective-display device toward an optical element (the lens 140, which is a collimating-focusing component) so as to collimate the display light, and is also used for directing the incoming light reflected from the eye 110 toward the optical element so as to focus the light onto the optical sensor 128 via the illumination prism 160. The polarization-and-spectrally selective beamsplitter can be provided via a polarization and spectrally selective coating, in the form of a dielectric coating, directly on one of the hypotenuse sides.

In certain preferred implementations, the surfaces 190 and 192 are mutually parallel, and the surfaces 188 and 194 are mutually parallel. In certain particularly preferred implementations, the prism 180 is a cuboid prism, i.e., with rectangular faces orthogonal to each other, and in certain particularly preferred examples illustrated here, it is a square cuboid prism, where each constituent prism 182 and 184 has a 45-degree right-angled cross-sectional shape.

A source of polarized light 176 (which can be a combination of a light source (e.g., LED) with a polarizer) is associated with the light-wave entrance surface 168. The source of polarized light 176 is configured to emit polarized light in the second optical spectrum (i.e., visible region), represented schematically as incident beam 158. A reflective-display device 178 (preferably implemented as a liquid crystal on silicon (LCoS) microdisplay), generating spatial modulation of reflected light corresponding to an image, is associated with the image display surface 170. The reflective-display device 178 is illuminated by the incident beam 158 from the source of polarized light 176 reflected from beam splitter configuration 166. The reflective-display device 178 is configured such that the reflected light corresponding to a bright region of a desired image has a polarization rotated relative to the source of polarized light. Thus, as shown in FIG. 5, polarized illumination 158 enters the prism 160 through the light-wave entrance surface 168 with a first polarization, typically an s-polarization relative to the surface of the beamsplitter configuration 166, and is reflected towards the image display surface 170 where it impinges on the reflective-display device 178. Pixels corresponding to bright regions of the image are reflected with modulated rotated polarization (typically p-polarized) so that radiation from the bright pixels is transmitted through the beamsplitter configuration 166 and exits the prism 160 via transmission through the light-wave exit-and-entrance surface 172. The light then enters the prism 180 through the light-wave exit-and-entrance surface 190 with the second polarization (typically p-polarized relative to the surface of the polarization-and-spectrally selective beamsplitter configuration 186) and reaches the collimation-focusing surface 192 where it passes through at least one retardation plate 196, preferably a quarter-wave plate, associated with at least part of the collimation-focusing surface 192, enters at least one light-wave collimating-focusing component, namely the lens 140, overlying at least part of the retardation plate 196, and is reflected back through the retardation plate 196 by a reflecting surface 141 of the lens 140. The double pass through the retardation plate 196 aligned with its fast axis at 45 degrees to the polarization axes rotates the polarization (e.g., transforming the p-polarization to s-polarization) so that the collimated image illumination is reflected at the polarization-and-spectrally selective beamsplitter configuration 186 towards the light-wave exit-and-entrance surface 194 and exits the prism 180 as the beam of illumination 142. The beam of illumination 142 is then coupled into the LOE 102 by the optical coupling configuration 124.

Figure 6:
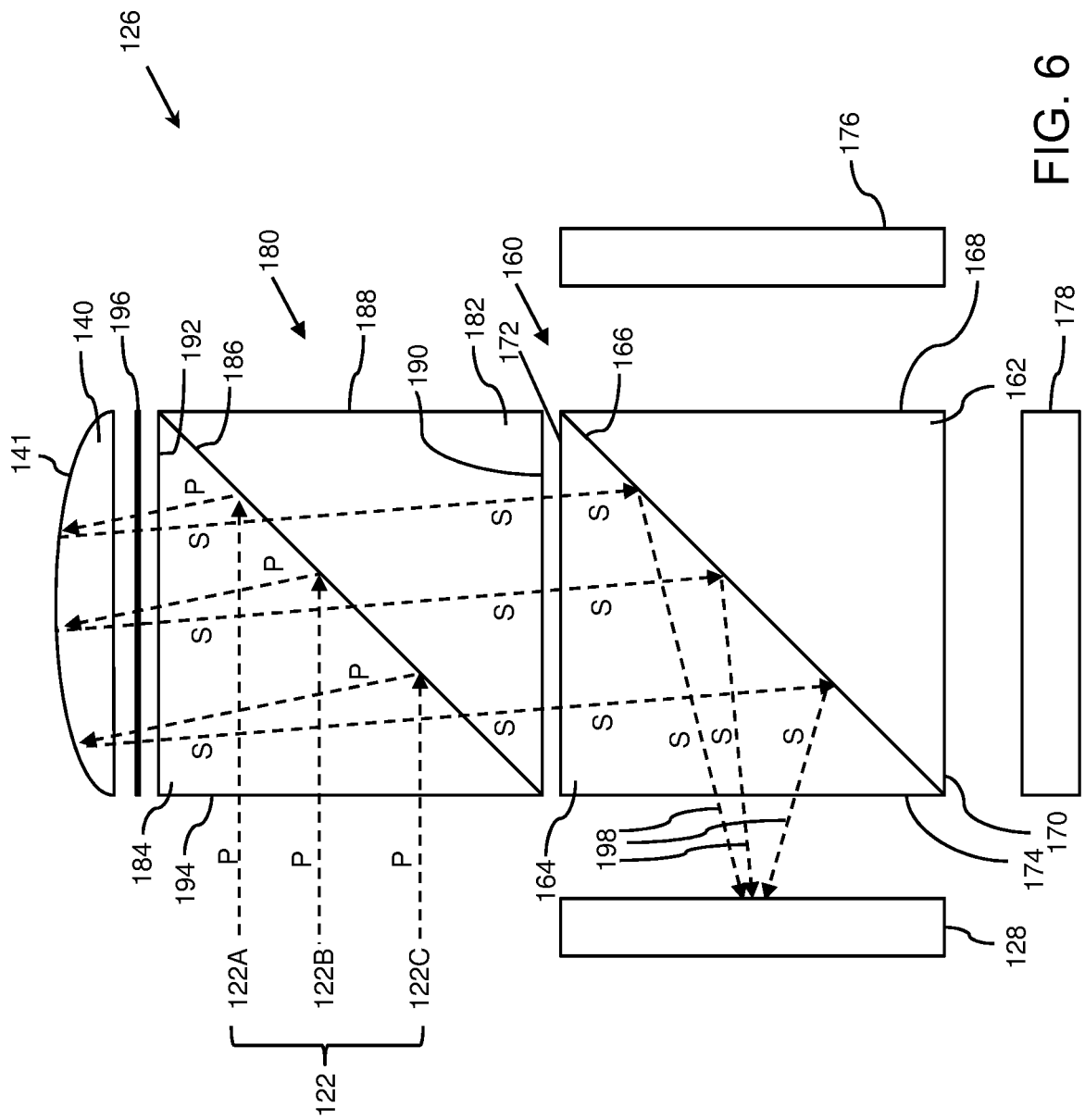
FIG. 6 is a schematic exploded plan view of the image projector of FIG. 5, showing the propagation of eye-tracking light to an optical sensor.

FIG. 6 illustrates schematically the light path followed by the collimated light reflected from the eye 110 through the optical module 126 after being coupled out of the LOE 102 by the optical coupling configuration 124. Recall from FIGS. 2 and 3, the collimated light 116A-116F reflected from the eye 110 that propagates through the LOE 102 in the reverse direction is coupled out of the LOE 102 by the optical coupling configuration 124 as the light rays 122A-122C representative of the beam of illumination 122. The illumination 122 (typically in the NIR region) may include two orthogonally polarized components (i.e., a first polarization component (e.g., p-polarization relative to the surface of the beamsplitter configuration 186) that is collimated and a second polarization component (e.g., s-polarization relative to the surface of the beamsplitter configuration 186) that is not collimated). The illumination 122 enters the prism 180 through the light-wave exit-and-entrance surface 194. As discussed, the polarization-and-spectrally selective beamsplitter configuration 186 reflects p-polarized light and transmits s-polarized light having wavelengths in the first optical spectrum (e.g., NIR region). Therefore, the second polarization component of the illumination 122 is transmitted by the beamsplitter configuration 186 and exits the prism 180 via the surface 188. The first polarization component (typically p-polarization relative to the surface of the beamsplitter configuration 186) of the illumination 122 (which is collimated) is reflected by the polarization-and-spectrally selective beamsplitter configuration 186 and reaches the collimation-focusing surface 192 where it passes through the retardation plate 196, enters the collimating-focusing component 140, and is reflected back through the retardation plate 196 by the reflecting surface 141 of the lens 140. Whereas the collimating-focusing component 140 acts to collimate the uncollimated illumination 158 in FIG. 5, the collimating-focusing component 140 performs the opposite function on the collimated illumination 122 in FIG. 6, namely applying optical power to the incident collimated light rays so as to convert sets of parallel light rays (collimated light rays 122A, 122B, and 122C) into converging beams of captured light, i.e., focusing the illumination 122 on the optical sensor 128. In addition, and similar to as described with reference to FIG. 5, the double pass through the retardation plate 196 aligned with its fast axis at 45 degrees to the polarization axes rotates the polarization (e.g., transforming the p-polarization to s-polarization) of the illumination 122 so that the focused illumination is transmitted through the polarization-and-spectrally selective beamsplitter configuration 186 and exits the prism 180 via transmission through the light-wave exit-and-entrance surface 190. The light then enters the prism 160 through the light-wave exit-and-entrance surface 172 with a first polarization (typically s-polarization relative to the surface of the beamsplitter configuration 166). As previously discussed, the beamsplitter configuration 166 reflects s-polarized light and transmits p-polarized light. These reflection and transmission characteristics are based only on the polarization of the incident light, therefore both NIR and visible light are handled in the same way by the beamsplitter configuration 166. Thus, the s-polarized NIR light is reflected at the beamsplitter configuration 166 towards the light-wave exit surface 174 and exits the prism 160 as a focused beam of illumination 198, which impinges on the optical sensor 128.

It is also noted that for each instance where a particular polarized wave path has been followed in the examples described herein, the polarizations are interchangeable, whereby, for example, on altering the polarization selective properties of the beamsplitter configurations 166, 186 and the lens 112, each mention of p-polarized light could be replaced by s-polarized light, and vice versa. For example, the lens 112 may be configured to collimate s-polarized components of (NIR) light. In such a configuration, the source of polarized light 176 is configured to emit p-polarized incident beam 158, the beamsplitter configuration 166 reflects p-polarized light and transmits s-polarized light (in both the photopic and NIR region), and the beamsplitter configuration 186 reflects s-polarized light and transmits p-polarized light having wavelengths in the NIR region and reflects p-polarized light and transmits s-polarized light having wavelengths in the photopic (visible light) region.

Figure 7:
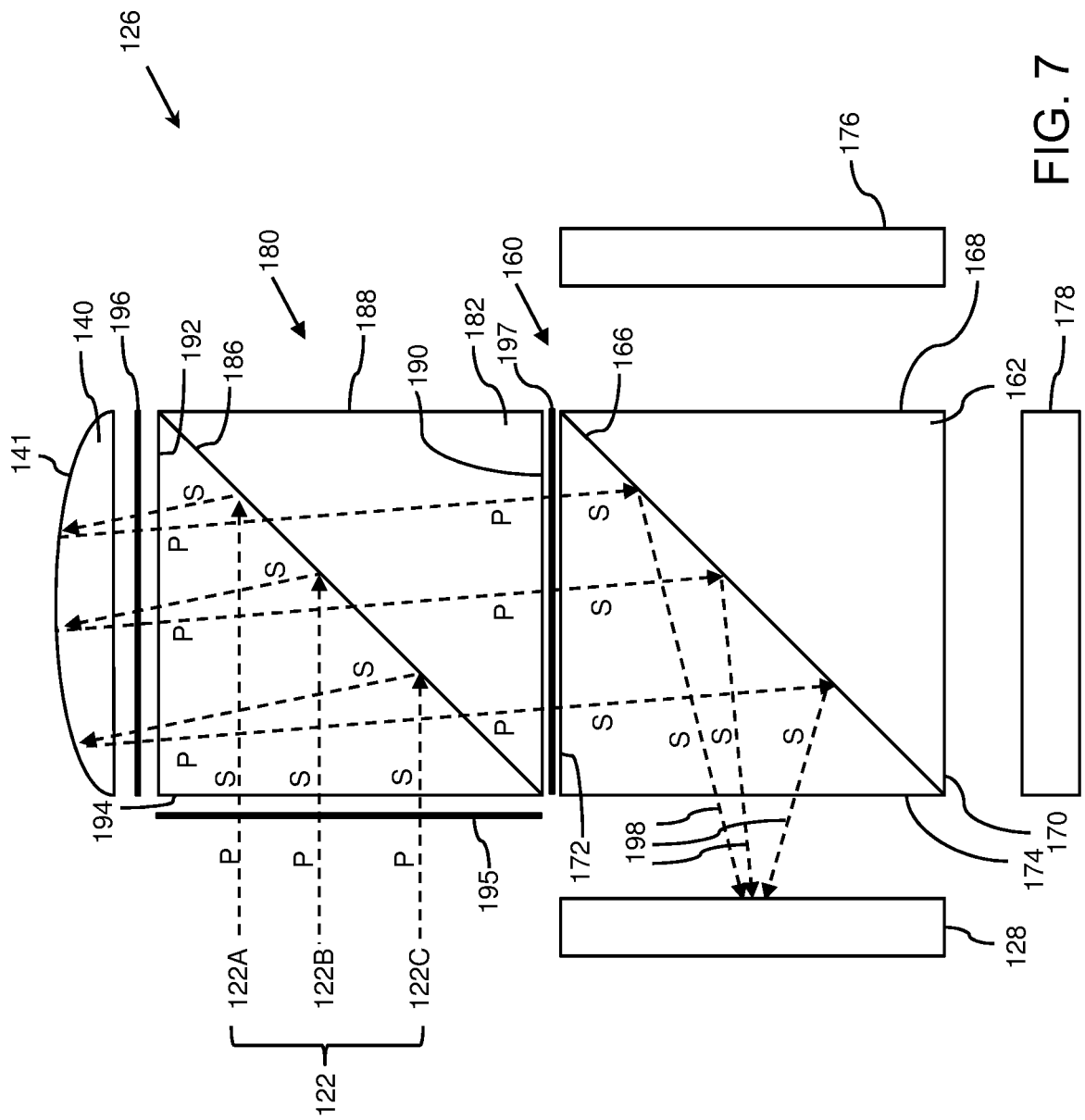
FIG. 7 is a schematic exploded plan view of the image projector of FIGS. 5 and 6, modified by the addition of retardation plates, and showing the propagation of eye-tracking light to the optical sensor.

The polarization-and-spectrally selective beamsplitter configuration 186 illustrated in FIGS. 5 and 6 may have certain drawbacks, notably the complexity in the design of the coatings that provide the proper spectral-and-polarization-selective transmission and reflection of incident light. One alternative to the beamsplitter design illustrated in FIGS. 5 and 6 is shown in FIG. 7. Here, the beamsplitter configuration 186 is implemented as a polarization selective beamsplitter configuration (similar to the beamsplitter configuration 166), i.e., it reflects s-polarized light and transmits p-polarized light in both the first and second optical spectra (i.e., visible light and NIR light are treated the same by the beamsplitter configuration 186). Since the beamsplitter configuration 186 illustrated in FIG. 7 does not discriminate between light in the first or second optical spectra, two additional retardation plates are deployed to handle polarization rotation for NIR light. Specifically, a retardation plate 195 is associated with at least part of the light-wave exit-and-entrance surface 194, and another retardation plate 197 is associated with the light-wave exit-and-entrance surface 172 and the light-wave exit-and-entrance surface 190 so as to be deployed between the prisms 160 and 180. The retardation plates 195, 197 act as half wave plates for incident light in first optical spectrum (i.e., NIR light) thereby rotating the polarization of incident NIR light, and act as full wave plates for incident light in the second optical spectrum (i.e., photopic (visible) light) thereby not effecting the polarization state of incident photopic light.

Accordingly, the first polarization (typically p-polarized) component of the illumination 122 that impinges on the retardation plate 195 has its polarization rotated to a second orthogonal polarization (e.g., transforming p-polarization to s-polarization) by the retardation plate 195, and the second polarization (typically s-polarized) component of the illumination 122 that impinges on the retardation plate 195 has its polarization rotated to the first orthogonal polarization (e.g., transforming s-polarization to p-polarization) by the retardation plate 195. The illumination 122 (after having passed through the retardation plate 195) enters the prism 180 through the light-wave exit-and-entrance surface 194. The component of the illumination 122 that enters the prism as p-polarized (relative to the surface of the polarization selective beamsplitter configuration 186) is transmitted by the beamsplitter configuration 186 and exits the prism 180 via the surface 188. The component of the illumination 122 that enters the prism as s-polarized (relative to the surface of the polarization selective beamsplitter configuration 186) is reflected by the beamsplitter configuration 186 and reaches the collimation-focusing surface 192 where it passes through the retardation plate 196, enters the collimating-focusing component (i.e., lens) 140, and is reflected back through the retardation plate 196 by the reflecting surface 141 of the lens 140 so as to rotate the polarization (e.g., transforming the s-polarization to p-polarization) so that the focused illumination is transmitted through the polarization selective beamsplitter configuration 186 and exits the prism 180 via transmission through the light-wave exit-and-entrance surface 190. The light then impinges on the retardation plate 197 with a first polarization (typically p-polarized) and has its polarization rotated to a second orthogonal polarization (e.g., transforming p-polarization to s-polarization) by the retardation plate 197 such that the illumination 122 enters the prism 160 through the light-wave exit-and-entrance surface 172 with s-polarization relative to the surface of the beamsplitter configuration 166. The now s-polarized light is reflected by the beamsplitter configuration 166 towards the light-wave exit surface 174 and exits the prism 160 as a focused beam of illumination 198, which impinges on the optical sensor 128.

Note that since the retardation plates 195, 197 act as full wave plates for photopic light, the path of traversal through the prisms 160, 180 from the source of polarized light 176 to the output of the prism 180 (light-wave exit-and-entrance surface 194), as well as the polarization direction of the traversing light, are unaffected by the retardation plates 195, 197.

It is noted that the configuration of the optical module 126 illustrated in FIG. 7 is applicable to situations in which the lens 112 discriminates between a first type of light, i.e., eye tracking light (light from the eye 110) and a second type of light, i.e., image light (light from the reflective-display device 178) based at least in part on polarization separation. In configurations in which the lens 112 discriminates between these two types of light based only on spectral separation, the retardation plate 195 is not needed. This is due to the fact that the eye may be illuminated such that the eye tracking light generally includes s and p polarization components which are both collimated by the lens 112 (since the lens 112 collimates light in the optical spectrum occupied by the eye tracking light, e.g., the NIR region without regard to polarization). Thus, the illumination 122 that is coupled-out from the LOE 102 to the optical module 126 is collimated for the components of s-polarization and p-polarization (relative to the surface of the beamsplitter configuration 186). Here, the p-polarization component will enter the prism 180 through the surface 194, will be transmitted by the beamsplitter configuration 186, and exit the prism 180 through the surface 188. The s-polarization component enters the prism 180 through the surface 194, is reflected by the beamsplitter configuration 186, exits the prism 180 through the surface 192 and reaches the collimation-focusing surface 192 where it passes through the retardation plate 196, enters the collimating-focusing component (i.e., lens) 140, and is reflected back through the retardation plate 196 by the reflecting surface 141 of the lens 140 so as to rotate the polarization (e.g., transforming the s-polarization to p-polarization) so that the focused illumination is transmitted through the beamsplitter configuration 186 and exits the prism 180 via transmission through the light-wave exit-and-entrance surface 190.

Other implementations of the beamsplitter configurations 166, 186 are contemplated herein, including, for example, implementation of one or both of the beamsplitters configurations 166, 186 of the optical module 126 as simple 50-50 beamsplitters, which reflect approximately half of the intensity of incident light and transmit approximately half of the intensity of incident light. Alternatively, both of the beamsplitter configurations can be implemented as polarization selective beamsplitter configurations for incident light in the second optical spectrum (visible light) and as simple 50-50 beamsplitters for incident light in the first optical spectrum (NIR light). For example, the beamsplitter configurations can reflect s-polarized visible light and transmit p-polarized visible light, and reflect approximately half of the intensity of incident NIR light and transmit approximately half of the intensity of incident NIR light. It is noted, however, that in such 50-50 beamsplitter configurations, only approximately 25% of the intensity of the initially incident light reaches the output.

Various configurations of the illumination arrangement 138 are contemplated herein. In all of the illumination arrangement configurations, the illumination arrangement 138 includes one or more light source configured to illuminate the eye 110 with light of the first type (i.e., light in a first optical spectrum (e.g., NIR light) that includes components of light that are polarized in a first polarization direction (e.g., p-polarized)). Ideally, the light source(s) of the illumination arrangement 138 is/are deployed to illuminate the eye 110 in an illumination direction that is as close to normal to the EMB 109 as possible. In an alternative configuration, the light source(s) is/are deployed at periphery of the field of view of the eye 110 so as to illuminate the eye 110 from the side. In yet another configuration, the illumination arrangement 138 is deployed as part of the optical module 126, which in addition to generating and projecting the image 142 into the LOE 102 for viewing by the eye 110 can also be configured to inject light from the illumination arrangement 138 into the LOE 102 to propagate in the forward direction so as to be coupled out of the LOE 102 by the partially reflective surfaces 108 in a coupling out direction that is normal to the EMB 109.

Figure 8:
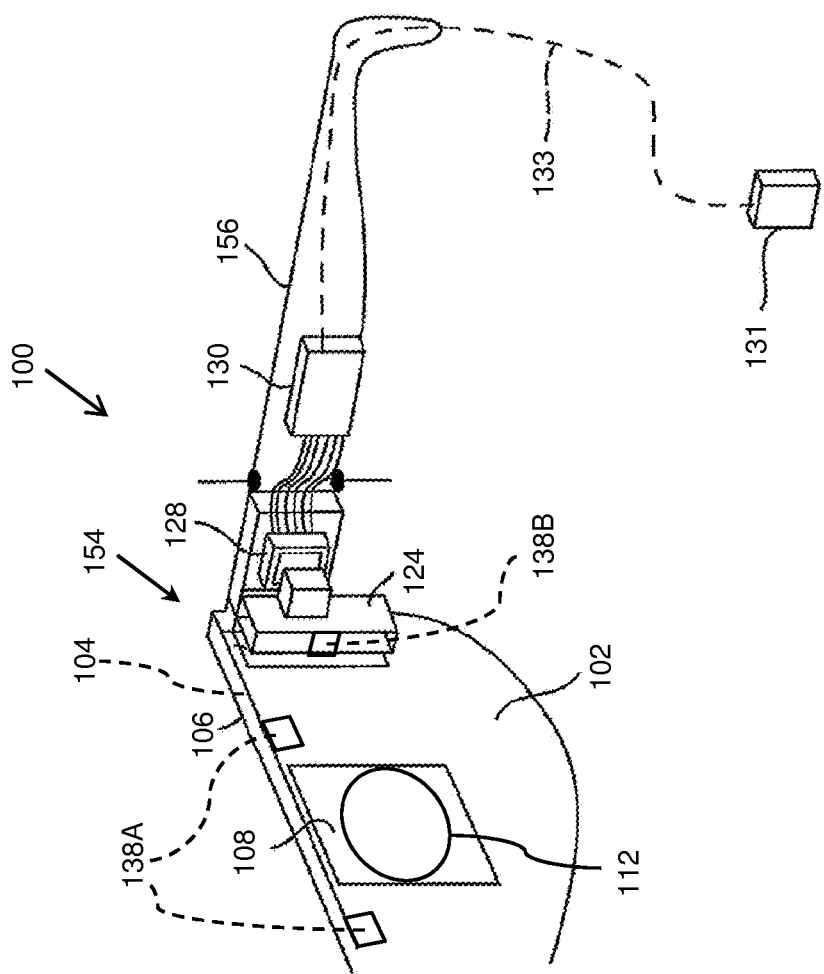
FIG. 8 is a partial schematic isometric view of the apparatus of FIG. 1, implemented in an eye-glasses form factor.

The following paragraphs describe several of the deployment options for the illumination arrangement 138 with particular reference to FIG. 8. The non-limiting implementation of the apparatus 100 illustrated in FIG. 8 is intended to provide context as to the general deployment options for the illumination arrangement 138. In the particular non-limiting implementation illustrated here, the apparatus 100 is implemented in an eye-glasses form factor with a head-mounted mechanical body implemented as an eye-glasses frame 154 with side arms 156 for engaging the ears of the observer. It should be noted that other form factors, such as helmet-mounted form factors, vehicle windshield form factors, and other head-up display and near-eye display form factors also clearly fall within the scope of the present invention. The illumination arrangement 138 may include at least one source of light 138A (which in FIG. 8 is represented as two sources of light) deployed close to the active region of the LOE 102 (via for example direct or indirect attachment to the face 204) such that the light rays emitted by the source of light 138A reach the EMB 109 close to normal to the EMB 109. Alternatively, or in addition to the source of light 138A, the illumination arrangement 138 can include at least one other source of light 138B deployed near the side of the observer's head (in FIG. 8 this is illustrated as being attached to the optical coupling configuration 124 which is attached to the side arm 156). In such a configuration, the light rays emitted by the source of polarized light 138B reach the EMB 109 at an off-axis angle. As discussed, the light reflected from the eye 110 may include two orthogonally polarized components of light (i.e., s-polarization components and p-polarization components), and the lens 112 is configured to collimate only one of these two polarization directions. In the examples described herein, the lens 112 is preferably configured to apply optical power to the p-polarized components of light reflected from the eye 110 (so as to collimate the p-polarized light) and to apply no optical power to the s-polarized components of light reflected from the eye 110.

The illumination arrangement 138 may be configured to illuminate specific regions of the eye 110 or the entire eye 110 with NIR light. As discussed in detail, the illumination that is reflected by the eye 110 (i.e., the light of the first type, represented by the light rays 114A-114F) is collimated (by the lens 112) and coupled into the LOE 102 by the partially reflective surfaces 108 and then coupled out of the LOE 102 (by the optical coupling configuration 124), where it is focused (by the lens 140) onto the optical sensor 128. The optical sensor 128 generates signals in response to sensing the focused light, and those signals are transferred to the processing system 130 which is configured to process the signals to derive a current gaze direction of the eye 110. In certain non-limiting implementations, the apparatus 100 obtains the gaze direction (the angular orientation of the eye 110, or line of sight of the eye 110) by imaging patterns that exist on specific regions of the eye 110. The position of such patterns and their motion are indicative of the current gaze direction and motion of the eye. The human eye includes various trackable features, including, for example, patterns generated by the blood vessels of the retina. These trackable features can be tracked using appropriate tracking algorithms implemented by suitable image processing instructions performed by the processing system 130.

In a non-limiting process for deriving and tracking the gaze direction, the retina pattern is mapped and trackable features are determined during an initial setup process, and then a continuous tracking process is performed. For example, an image marker may be displayed to the observer for the observer to look at during an initialization. While the observer looks towards the marker, the illumination arrangement 138 fully illuminates the fundus (visible portion of the retina) by short pulses and a full image of the fundus obtained (via the optical sensor 128). This image is then processed by processing system 130 to identify trackable features (for example, the optic disc and the fovea). During the continuous tracking process, selected regions of interest (ROI) of the eye 110 are selectively illuminated by the illumination arrangement 138, and an image of the ROI (obtained by the optical sensor 128) is sampled and processed (by the processing system 130) during the corresponding illumination pulse to determine the current gaze direction (line of sight), and this derived gaze direction is used to update the position of the ROI for the subsequent illumination cycle, and the continuous tracking process repeats by illuminating the updated ROI. Assuming that the frequency of the tracking measurements is high compared to the speed of motion of the eye, this update process is typically effective to maintain continuous tracking, optionally combined with tracking information from the other eye. As the gaze direction changes, so does the illumination area. Updating of the ROI may be performed according to the "current" gaze direction as determined from the last sampled image or, in certain cases, may use predictive extrapolation based on eye motion between the previous two or more measurements. In the event that tracking fails, the size of the illuminated region can be temporarily increased until the trackable features are recovered.

Looking again at FIG. 8, the processing system 130 may be implemented using any suitable type of processing hardware and/or software, as is known in the art, including but not limited to any combination of various dedicated graphics processors, display drivers, and computerized processors (collectively designated as processor 132) operating under any suitable operating system and implementing suitable software or firmware modules. The storage medium 134 can be one or more computerized memory devices, such as volatile data storage. The processing system 130 may further include various communications components for allowing wired or wireless communication with LAN and/or WAN devices for bidirectional transfer of information and graphic content. The apparatus 100 is powered from a suitable electrical power source, which may be any combination of batteries and/or an external power source provided, illustrated here schematically as power source 131 connected via a cable 133. Where battery power is used, the batteries may be integrated as part of the eye-glasses or helmet-mounted structure.

The optical components associated with the faces 104, 106 of the LOE 102, such as the lens 112 and the polarizer 136, are optically attached to the LOE 102 using any suitable attachment technique, including, for example, mechanical attachment to the LOE 102 while maintaining an air gap or material (e.g., gel) gap between the optical component and the face of the LOE 102. The material occupying such an air gap or material gap has a refractive index that is sufficiently low enough to preserve the conditions of total internal reflection within the LOE 102. Other suitable alternatives for optically attaching optical components to the LOE 102 include deployment of an air gap film having a hyperfine structure between the face of the LOE 102 and the optical component, or deployment of a transparent layer of low refractive index material (such as a thin plate of low index material). Further details of such optical attachment methodologies can be found in the applicant's commonly owned U.S. Pat. No. 10,520,731 and US Patent Application Publication No. 2018/0067315. The quarter wave plate 150 may be attached to the lens 112 using similar optical attachment techniques.

Although the embodiments of the apparatus 100 described thus far have pertained to an optical coupling configuration implemented as a set of partially reflective surfaces 108 for coupling eye tracking light into the LOE 102 and for coupling image light (from the optical module 126) out of the LOE 102, the partially reflective surfaces 108 are merely illustrative of one non-limiting optical coupling configuration, and other optical coupling configurations can be used to couple eye tracking light into, and image light out of, the LOE 102. The optical coupling configuration may be any optical coupling arrangement which deflects part of the eye tracking incident radiation from the lens 112 to an angle which propagates through internal reflection within the LOE 102, and likewise deflects part of the image incident radiation (from the optical module 126) already propagating within the LOE 102 by internal reflection to an angle such that the deflected part of the image incident radiation exits the LOE 102. Other examples of such suitable optical coupling arrangements include, but are not limited to, one or more diffractive optical elements deployed on either of the faces 104, 106.

The embodiments of the apparatus as described with respect to FIGS. 2-8 have pertained to utilization of a polarization and/or spectrally (wavelength) sensitive collimating element (lens 112) to collimate only particular components of the eye-tracking light (i.e., light reflected from the eye of the observer) so as to be able to focus the coupled-in collimated light onto an optical sensor integrated into the image projector (optical module 126). Other eye-tracking solutions are contemplated herein in which uncollimated light from the eye is coupled into a light-guiding optical element and is directed by a bi-conic lens, having a different radius of curvature for two orthogonal axes, onto an optical sensor in order to image the eye and determine the angles at which light emanates from the eye. Such solutions employ a specialized at least partially reflective surface, preferably deployed in a dedicated light-guide optical element separate from the LOE through which the projected image propagates.

Referring now to FIGS. 9-15, there is illustrated various aspects of the structure and operation of an apparatus, generally designated 200, constructed and operative according to various embodiments of the present invention, for displaying an image and for deriving a gaze direction of the human eye 210 by way of a coupling-in configuration associated with a light-guide optical element (LOE). In the preferred but non-limiting implementation illustrated here, the coupling-in configuration is implemented as a surface 208 that is at least partially reflective to light emanating from the eye 210. The surface 208 is interchangeably referred to hereinafter as an at least partially reflective surface 208. The surface 208 is associated with a first LOE 202 that is configured for propagating light reflected from the eye (in response to illumination by an illumination arrangement 242), and that is separate from a second LOE 212 that is configured for propagating a projected image that is to be coupled out for viewing by the eye 210. The LOE 202 is formed from transparent material and has a pair of parallel faces (planar major surfaces) 204, 206 for guiding light by internal reflection (preferably total internal reflection). The surface 208 is configured for coupling-in a proportion of light incident on the face 204 within a coupling-in region 243 so to propagate within the LOE 202 by (total) internal reflection. In particular, the surface 208 is deployed within the LOE 202 (i.e., between the faces 204, 206) obliquely to the parallel faces 204, 206 such that the coupled-in light is trapped within the substrate 202 by internal reflection from the faces 204, 206. The coupling-in region 243 of the LOE 202, also referred to as the "active region" or "active area", is a two-dimensional region of the face 204.

Figure 9:
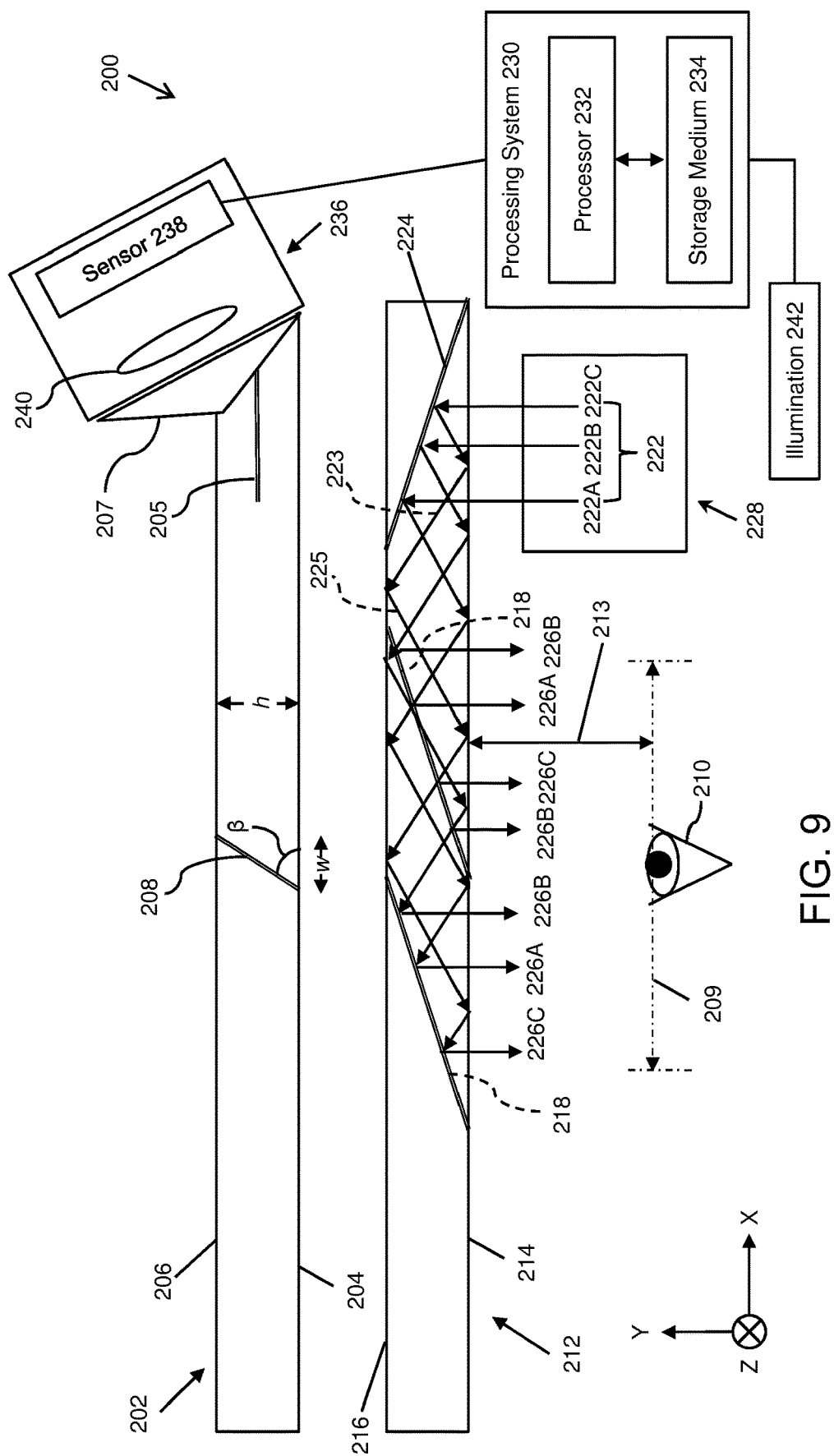
FIG. 9 is a schematic side view of an apparatus, constructed and operative according to another embodiment of the present invention, for displaying an image and for tracking the gaze direction of a human eye, having a first light-transmitting substrate for eye-tracking and a second-light transmitting substrate for image projection, and showing the propagation of light from the eye to an image projector via the second light-transmitting substrate.

The light coupled-in by the surface 208 propagates through the LOE 202 in the reverse direction until reaching a coupling-out optical configuration 207 (shown schematically as a prism in FIG. 9, but can also be implemented as, for example, a reflecting surface). Preferably, a mixer 205, implemented as a partially reflective surface, is deployed within the LOE 202 on a plane parallel to the faces 204, 206 (preferably at the mid-plane between the faces 204 and 206) upstream from and adjacent to the coupling out optical configuration 207, to mitigate non-uniformity of the light propagating through the LOE 202. The light is coupled out of the LOE 202 to an optical module 236 by the coupling-out optical configuration 207. The optical module 236 includes a lens 240 (a bi-conic lens) and an optical sensor 238 (although the sensor 238 may be external to the optical module 236). The coupled-out light passes through the lens 240 which directs the light onto the optical sensor 238 configured for sensing the light reflected from the eye 210. A processing system 230, that includes at least one computerized processor 232 coupled to a storage medium 234 (such as a computer memory or the like), is electrically associated with the optical sensor 238, and is configured to process signals from the optical sensor 238 to derive a current gaze direction of the eye 210.

The second LOE 212, configured for propagating a projected image that is to be coupled out for viewing by the eye 210, is formed from transparent material and has a pair of parallel faces (planar major surfaces) 214, 216 for guiding light by internal reflection (preferably total internal reflection). The LOE 212 is deployed with one of the parallel faces 214 in facing relation to the eye 210, where the eye 210 is located in the EMB 209 at an eye relief (ER) distance 213 from the face 214. An image projector 228 is configured to project an image 222 (collimated to infinity), as represented here schematically by a beam of illumination 222 including sample rays 222A, 222B, and 222C which span the beam. The projected image 222 is coupled into the LOE 212 by a coupling-in optical configuration 224, as illustrated here schematically by a reflecting surface (but other configurations, such as, for example, prisms, are contemplated herein), so as to generate reflected rays 223 which are trapped by internal reflection within the substrate, generating also rays 225. The image propagates along the substrate by repeated internal reflection, impinging on an optical coupling-out configuration associated with the second LOE 212, implemented as a sequence of partially reflecting surfaces 218 at an oblique angle to the parallel faces 214, 216, where part of the image intensity is reflected so as to be coupled out of the substrate as rays 226A, 226B, and 226C toward the eye 210. It is noted that the partially reflective surfaces 218 are merely illustrative of one non-limiting optical coupling-out configuration suitable for use with the LOE 212, and other optical coupling configurations can be used to couple image light out of the LOE 212. The optical coupling-out configuration may be any optical coupling arrangement which deflects part of the image propagating within the LOE 212 by internal reflection to an angle such that the deflected part of the image exits the LOE 212. Other examples of such suitable optical coupling arrangements include, but are not limited to, one or more diffractive optical elements deployed on either of the faces 214, 216.

The LOE 202 is deployed with one of the parallel faces 204 in facing relation to the eye 210, but with the LOE 212 interposed between the eye 210 and the LOE 202 and such that the faces 204 and 216 are parallel (or approximately parallel), aligned with, and adjacent to each other. The eye 210 is located at an eye relief (ER) distance 211 from the face 204. In the non-limiting configuration illustrated in the drawings, the LOEs 202 and 212 are deployed such that the LOEs 202 and 212 have a common direction of elongation (illustrated arbitrarily herein as corresponding to the x-axis), and such that the faces 204, 206, 214, 216 are mutually parallel. The LOEs 202 and 212 are preferably optically attached to each other at the faces 204, 216 to define an interface plane. Any suitable mechanism may be used for optically attaching the LOEs 202 and 212 to each other, including but not limited to a mechanical arrangement, and optical cement. For example, the faces 204, 206 may be cemented to each other by providing a layer of optical cement to at least one portion of at least one of the faces 204, 206 to form a cemented unitary optical structure formed from two light guides that perform separate functions.

As in the embodiments described with reference to FIGS. 2-8, in the present embodiments the eye 210 is preferably illuminated with light in a first optical spectrum (preferably the NIR region) such that light in the first optical spectrum is coupled into the LOE 202 by the surface 208, and the illumination 222 (i.e., the projected image) is in a second optical spectrum (the photopic, i.e., visible region). As discussed in the previous embodiments, the partially reflective surfaces 218 are preferably coated so as to have low reflectance for a first range of incident angles, while having the desired partial reflectivity for a second range of incident angles. In addition, the faces 214, 216 and the partially reflective surfaces 218 are preferably coated so as to have high transmittance for light in the first optical spectrum, such that the light reflected by the eye 210 passes through the LOE 212 with minimal loss of intensity before being coupled into the LOE 202.

Figure 10:
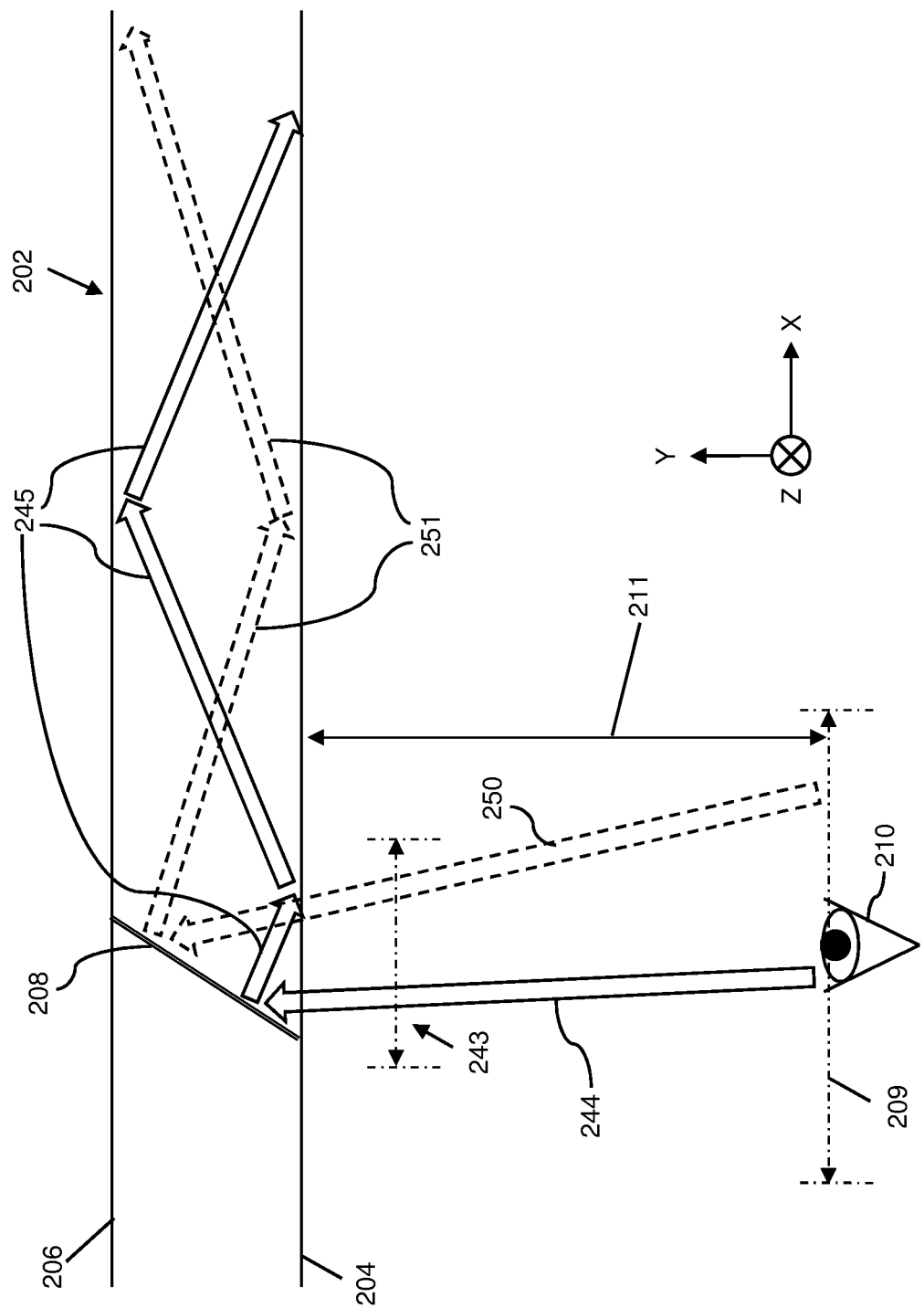
FIG. 10 is a partial schematic side view of the first light-transmitting substrate of the apparatus of FIG. 9, showing the coupling of beams of light from the eye into the first light-transmitting substrate.

In contrast to the incident light from the eye that is coupled into the LOE 102 in the previously described embodiments (FIGS. 2-8), in the present embodiments the incident light from the eye 210 that is coupled into the LOE 202 is not collimated, resulting in an angular distribution of rays of incident light impinging on the surface 208 at different respective incident angles. With particular reference to FIG. 10, incident light from two different points within the EMB 209 along a first dimension of the EMB 209 (the first dimension being along the x-axis in the arbitrarily labeled XYZ coordinate system in the drawings) impinge on the surface 208 so as to be coupled into the LOE 202. The incident light, represented here schematically by a first beam of illumination 244 and a second beam of illumination 250, is light (preferably in the NIR region) that is reflected by the eye 210 in response to illumination from the illumination arrangement 242. Note that the two beams 244, 250 merely illustrate a sample of the beams from the EMB 209 that are coupled into the LOE 202 by the surface 208, additional beams from additional respective points within the EMB 209 are also coupled into the LOE 202 by the surface 208. As can be seen, each of the beams 244, 250 generally arrives at the surface 208 at a different incident angle, such that the beams 244, 250 generate respective reflected beams 245, 251 that are trapped within the LOE 202 by internal reflection, but which propagate within the LOE 202 at different angles relative to the faces 204, 206.

Figure 11:
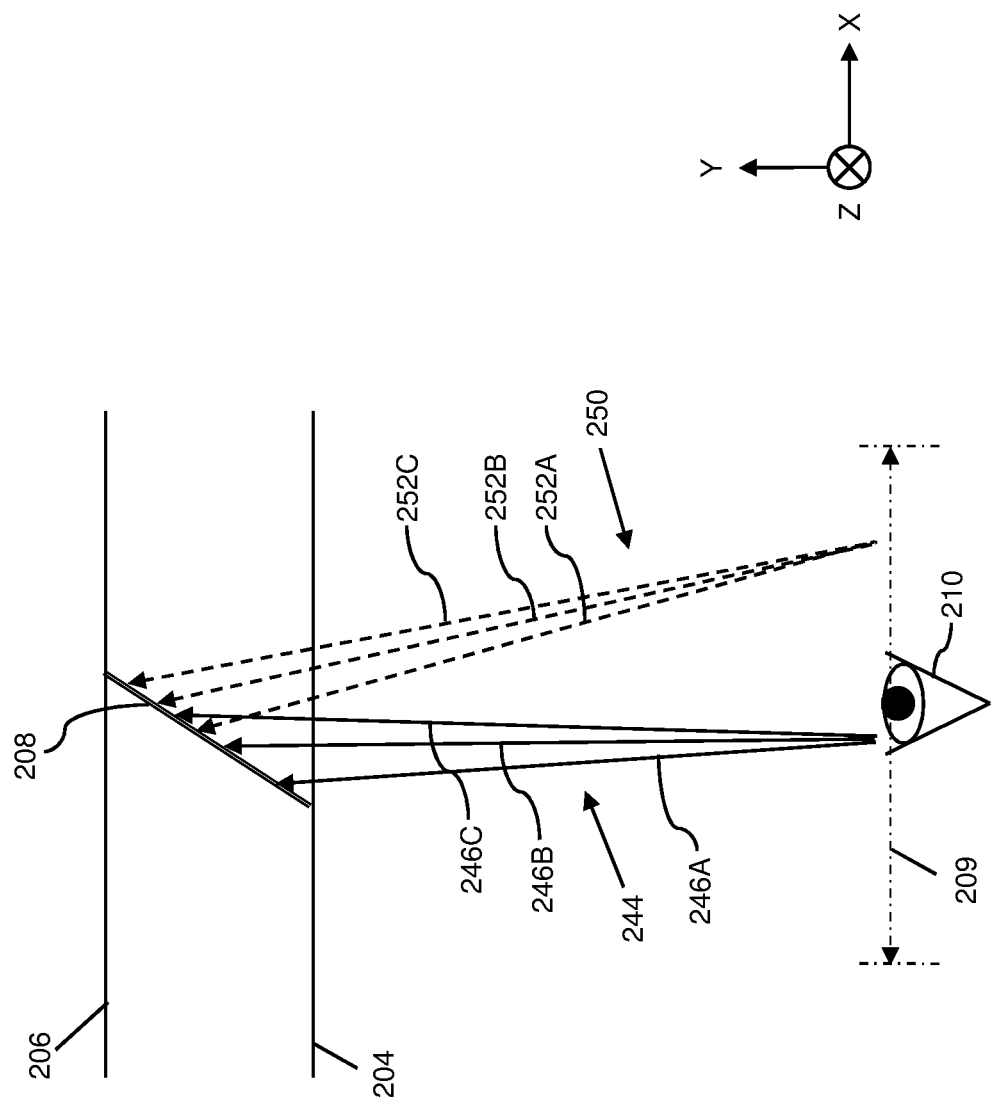
FIG. 11 is a partial schematic side view similar to FIG. 10, showing multiple light rays spanning the beams of light from the eye in a first dimension.

As shown in FIG. 11, each of the beams 244, 250 includes light rays which span the beam. In the illustrated example, the beam 244 includes sample rays 246A, 246B, and 246C which span the beam 244 along at least a portion of the coupling-in region 243 in the first dimension (along the x-axis), where the rays 246A and 246C are the marginal rays of the beam 244. Similarly, the beam 250 includes sample rays 252A, 252B, and 252C along at least a portion of the coupling-in region 243 in the first dimension (along the x-axis), where the rays 252A and 252C are the marginal rays of the beam 250. Each of the rays 246A, 246B, 246C, 252A, 252B, and 252C is incident on the face 204 at a different respective point of the face 204 along the first dimension of the face 204 (the x-axis in the drawings), and therefore is incident on the surface 208 at different respective incident angles. Therefore, each of the rays 246A, 246B, 246C, 252A, 252B, and 252C arrives at the surface 208 at a different incident angle, such that the reflected beams 245, 251 each include spaced apart reflected rays (spanning the respective beam) which propagate within the LOE 202.

The angular distribution of the light (spanned by the beams 244, 250, and spanned by the rays spanning the beams 244, 250) that is coupled into the LOE 202 by the surface 208 is a function the aperture width of the surface 208 (the width being projected on the plane parallel to the EMB 209). The aperture width is inversely proportional to the steepness of the deployment angle β of the surface 208 (measured relative to the face 204), such that for steep deployment angles, the aperture width is effectively small, thereby providing high resolution in the angular spanning dimension (x-axis in the drawings). In the present embodiments, the surface 208 is deployed at a steeper angle than the partially reflective surfaces 218, and is deployed at an angle steep enough such that the aperture width of the surface 208 is narrow enough relative to the distance between the LOE 202 and the EMB 209 such that light covering only a narrow angular distribution of angles is coupled into the LOE 202 by the surface 208.

The resolution can roughly be approximated by the width of the surface 208 projected on the plane parallel to the face 204. In FIG. 9, the width is denoted as w, and can be calculated as h/tan(β), where h is thickness of the LOE 202 (i.e., the minimum distance between the planar faces 204, 206). For example, for h=1 mm and β=65°, w≈0.47 mm. A resolution of 0.47 mm is smaller than that of the pupil of the human eye, so such parameters for h and β could provide a high-resolution image at the optical sensor 238, and decreasing the width (by increasing the deployment angle β and/or decreasing the thickness h) could produce an even higher resolution image. It is noted, however, that as the width is decreased, the strength of the signals output by the optical sensor 238 also decrease, reducing the overall signal-to-noise ratio of the output signal. Therefore, care should be taken to find the appropriate balance between a small aperture width that corresponds to a reasonable signal-to-noise ratio at the optical sensor 238.

Figure 12:
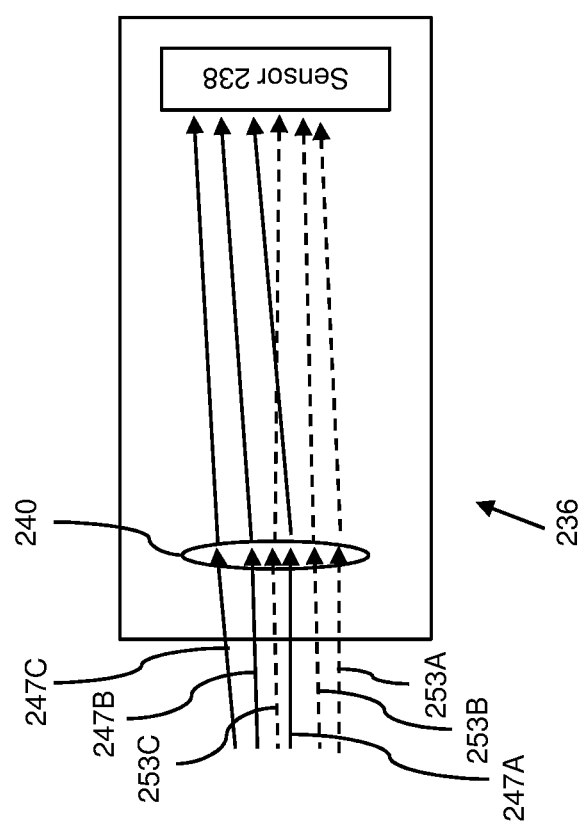
FIG. 12 is a schematic side view of an optical module of the apparatus of FIG. 9, showing light rays corresponding to the light rays of FIG. 11 being directed onto an optical sensor by a lens.

Turning now to FIG. 12, there is shown coupled-out light rays 247A, 247B, and 247C, and the coupled-out light rays 253A, 253B, and 253C, being received at the optical module 236. The light rays 247A, 247B, and 247C and the light rays 253A, 253B, and 253C correspond to incident light rays spanning an angular distribution in a first dimension (width) of the surface 208. In particular, the coupled-out light rays 247A, 247B, and 247C correspond to the incident light rays 246A, 246B, and 246C, and the coupled-out light rays 253A, 253B, and 253C correspond to the incident light rays 252A, 252B, and 252C. The coupled-out light rays 247A, 247B, and 247C, and the coupled-out light rays 253A, 253B, and 253C pass through the lens 240, which applies optical power to the light rays so as to direct the light rays to the optical sensor 238.

As mentioned, the lens 240 is bi-conic, which in the present context refers to having a different radius of curvature for different axes. The different radii of curvature lead to the lens 240 having two focal lengths in two respective dimensions (orthogonal dimensions), namely a first focal length of $f_1$ in a first dimension and a second focal length of $f_2$ in a second dimension (orthogonal to the first dimension). The optical sensor 238 is deployed at a distance of $f_1$ from the lens 240. The first focal length $f_1$ and the positioning of optical sensor 238 at the first focal length $f_1$ are such that the lens 240 converts the light rays 247A, 247B, and 247C (and the light rays 253A, 253B, and 253C) into non-converging beams of captured light that reach different respective regions of the optical sensor 238 such that the angular distribution of the light rays 247A, 247B, and 247C (and the light rays 253A, 253B, and 253C) is indicative of the angular distribution (in the width dimension of the surface 208) of the corresponding beam 244 and (beam 250). Furthermore, the light rays 247A, 247B, and 247C, and the light rays 253A, 253B, and 253C reach different respective regions of the optical sensor 238 such that the overall angular separation between the sets of the rays 247A, 247B, and 247C, and the light rays 253A, 253B, and 253C at the optical sensor 238 is indicative of the angular separation (in the width dimension of the surface 208) between the beams 244 and 250. The optical sensor 238 can therefore measure the relative angles of the light (beams 244, 250) emanating from the EMB 209 that is coupled into the LOE 202 by the surface 208 with a reasonably high angular resolution. The angular resolution is generally a function of the effective aperture width of the surface 208 (previously described) and the eye relief (ER 211), and can be expressed as $\sin^{-1}(w/ER)$. For an effective aperture width (w) of 0.47 mm and an eye relief (ER) of 27 mm, the angular resolution provided by the optical sensor 238 is approximately 1 degree. Parenthetically, as a result of the small angular resolution, the requirements for parallelism between the principle planes of the LOE 202 is much more lenient than for the LOE 212 used for image projection to the eye 210, where parallelism on the order of about 1 arc min may be required.

The lens 240 has a second focal length $f_2$ in a dimension orthogonal to the first focal length dimension. The bi-conic aspect of the lens 240 enables imaging of the eye 210 via incident light (reflected from the eye 210) spanning the coupling-in region 243 along two orthogonal dimensions. The imaging, via directing (by the lens 240) the coupled-out light corresponding to the incident light rays spanning the first dimension (along the x-axis) was discussed with reference to FIGS. 10-12. The following paragraphs will describe the imaging of the eye 210 via focusing coupled-out light rays, corresponding to incident light rays spanning a second dimension (along the z-axis), by the lens 240 onto the optical sensor 238.

Figure 13:
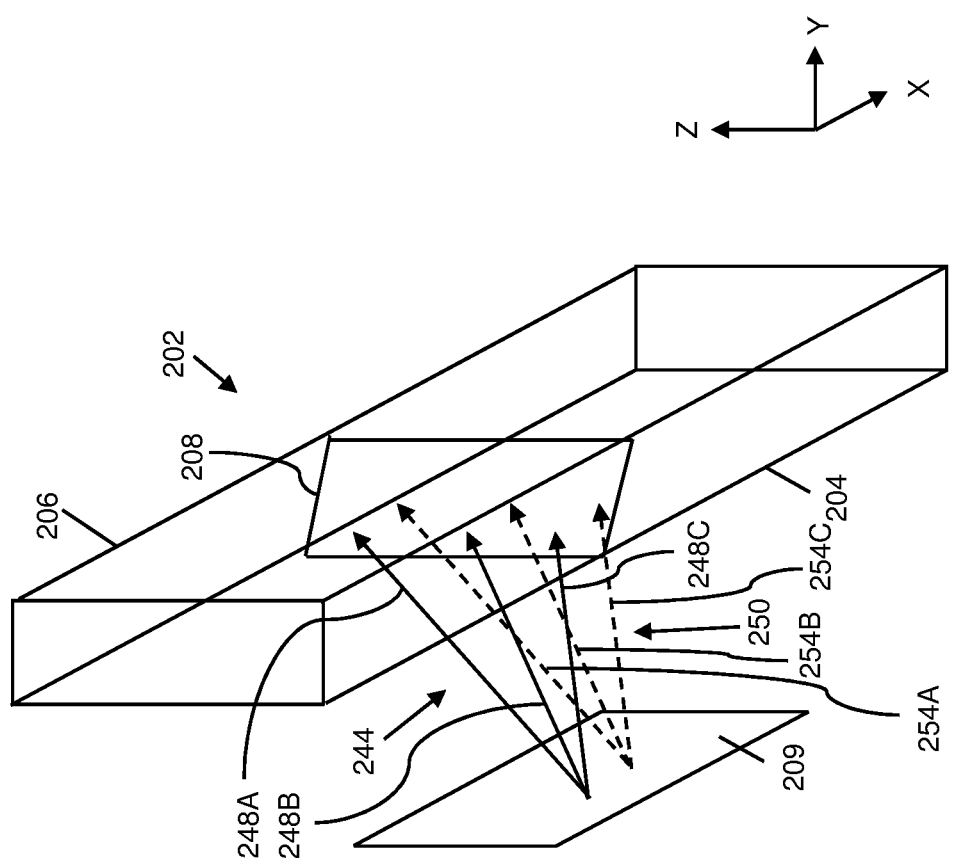
FIG. 13 is an isometric view of the first light-transmitting substrate of the apparatus of FIGS. 9 and 10, showing multiple light rays spanning the beams of light from the eye in a second dimension.

Referring now to FIG. 13, the beams 244, 250 also include light rays which span the respective beams along at least a portion of the coupling-in region 243 in the second dimension (along the z-axis). In the illustrated example, the beam 244 includes sample rays 248A, 248B, and 248C which originate from a common point of the EMB 209 and span the beam 244 along at least a portion of the coupling-in region 243 in the second dimension (along the x-axis), where the rays 248A and 248C are the marginal rays of the beam 244. Similarly, the beam 250 includes sample rays 254A, 254B, and 254C which originate from a common point of the EMB 209 and span the beam 250 along at least a portion of the coupling-in region 243 in the second dimension (along the x-axis), where the rays 254A and 254C are the marginal rays of the beam 250. The projection of the rays 246A, 246B, and 246C in the XY-plane are incident on the surface 208 at a common incident angle. Therefore, the light rays 246A, 246B, and 246C, when coupled-into the LOE 202 by the surface 208 generate sets of spaced apart parallel rays that propagate through the LOE 202. Similarly, the projection of the rays 254A, 254B, and 254C in the XY-plane are incident on the surface 208 at a common incident angle. Therefore, the light rays 254A, 254B, and 254C, when coupled-into the LOE 202 by the surface 208 generate sets of spaced apart parallel rays that propagate through the LOE 202.

Figure 14:
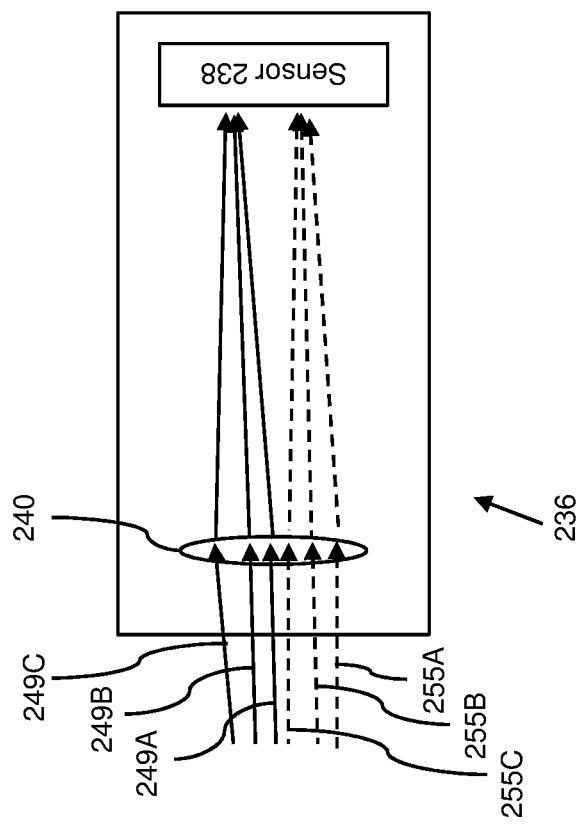
FIG. 14 is a schematic side view of the optical module of the apparatus of FIG. 9, showing light rays corresponding to the light rays of FIG. 13 being focused onto the optical sensor by the lens.

Turning now to FIG. 14, there is shown coupled-out light rays 249A, 249B, and 249C, and the coupled-out light rays 255A, 255B, and 255C, being received at the optical module 236. The light rays 249A, 249B, and 249C and the light rays 255A, 255B, and 255C correspond to incident light rays spanning the first dimension (height, along the z-axis) of the surface 208. In particular, the coupled-out light rays 249A, 249B, and 249C correspond to the incident light rays 248A, 248B, and 248C, and the coupled-out light rays 255A, 255B, and 255C correspond to the incident light rays 254A, 254B, and 254C. The coupled-out light rays 249A, 249B, and 249C, and the coupled-out light rays 255A, 255B, and 255C, pass through the lens 240, which applies optical power to the light rays so as to focus the light rays 249A, 249B, and 249C onto a common region (or spot) on an image plane of the optical sensor 238, and to focus the light rays 255A, 255B, and 255C onto a different common spot on the image plane of the optical sensor 238. In other words, the lens 240 converts the set of light rays 249A, 249B, and 249C into converging beams of captured light, and likewise converts the set of light rays 255A, 255B, and 255C into converging beams of captured light. The ability to focus these sets of the light rays onto the image plane is enabled by positioning the lens 240 at the output aperture of the LOE 202 and designing the lens 240 with a suitable second focal length $f_2$.

In general, the lens 240 is preferably designed such that the second focal length $f_2$ is given by $f_2 = uf_1/(u-f_1)$, where u is the in-plane distance light rays travel from the surface 208 to the lens 240 along the second dimension, and can be given by $u = ER + L_2/\cos(\theta)$, where $L_2$ is the in-plane distance from the surface 208 to the coupling-out optical configuration 207, and $\theta$ is the angle (measured relative to the face 204) at which the light propagates.

As in the embodiments described with reference to FIGS. 2-8, the optical sensor 238 in the present embodiments generates signals in response to sensing the light rays that reach the sensor, and those signals are transferred to the processing system 130 which is configured to process the signals to derive a current gaze direction of the eye 110. The derivation of gaze direction may be performed using similar steps to those previously described with reference to FIG. 2-8. In addition, the capability of the optical sensor 238 to measure the relative angles of the incident light (beams 244, 250) can be used to bolster the derivation of gaze direction in the present embodiments.

The possible deployment configurations of the illumination arrangement 242 are generally similar to those of the illumination arrangement 138 described with reference to FIG. 8. For example, the apparatus 200 may be implemented in an eye-glasses form factor with a head-mounted mechanical body implemented as an eye-glasses frame with side arms for engaging the ears of the observer. Other form factors, such as helmet-mounted form factors, vehicle windshield form factors, and other head-up display and near-eye display form factors are also contemplated herein. The illumination arrangement 242 may include one or more source of NIR light, which can be deployed, for example, close to the active region of the LOE 202 via for example direct or indirect attachment to the face 214 such that the light rays emitted by the source of light reach the EMB 209 close to normal to the EMB 209.

Alternatively, or in addition to the aforementioned configuration, the illumination arrangement 242 can include at least one other source of NIR light deployed near the side of the observer's head, for example attached to the image projector 228 or the coupling-in optical configuration 224 (which are preferably attached to one of the side arms of the eye-glasses frame). In such a configuration, the light rays emitted by the source of NIR light reach the EMB 209 at an off-axis angle.

Figure 15:
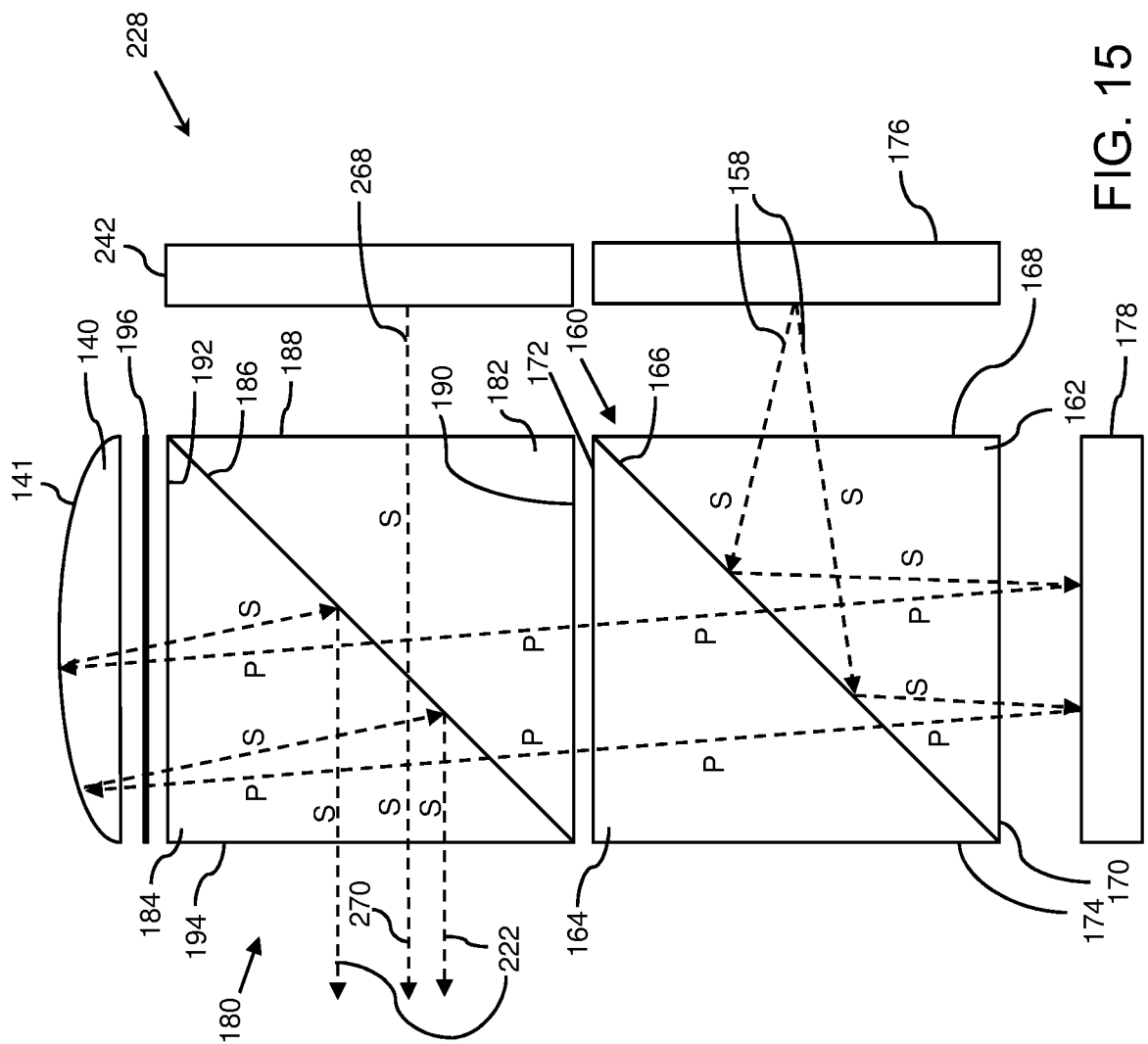
FIG. 15 is a schematic exploded plan view of the image projector of FIG. 9, showing the propagation of image light and eye-tracking light to an output of the image projector.

In addition, the LOE 212 may be used to illuminate the eye 210 at directions normal to the EMB 209. In such a configuration, the illumination arrangement 242 is integrated as part of the image projector 228, as illustrated in FIG. 15. The image projector 228 is generally similar to the image projector 126 illustrated in FIG. 5, with the exception that the image projector 228 does not include the optical sensor (since the optical sensor 238 is deployed in the optical module 236 that is separate optical from the image projector 228). In addition, since the optical sensor 238 is not part of the image projector 228, there is no need to design the beamsplitter configurations 166 and 186 with suitable coatings for spectral selectivity. Therefore, in the non-limiting example of the image projector 228 illustrated in FIG. 15, both of the beamsplitter configurations 166 and 186 are polarization selective beamsplitters which reflect incident light in a first polarization direction (e.g., s-polarized relative to the surface of the beamsplitter configuration 166, 186) and transmit incident light in a second polarization direction (e.g., p-polarized relative to the surface of the beamsplitter configuration 166, 186) for incident light in the first optical spectrum and incident light in the second optical spectrum (i.e., visible light and NIR light are treated the same by the beamsplitter configurations 166 and 186). In addition, since light only propagates through the LOE 212 in the forward direction, and therefore light does not enter the image projector 228 from the LOE 212, the surface 172 is a light-wave exit surface 172, the surface 190 is a light-wave entrance surface 190, and the surface 194 is a light-wave exit surface 194.

Similar to as described with reference to FIG. 5, the source of polarized light 176 emit polarized light in the second optical spectrum (i.e., visible region), represented schematically as incident beam 158. The polarized illumination 158 enters the prism 160 through the light-wave entrance surface 168 with a first polarization, typically an s-polarization relative to the surface of the polarization selective beamsplitter configuration 166, and is reflected towards the image display surface 170 by the polarization selective beamsplitter configuration 166 where it impinges on the reflective-display device 178. Pixels corresponding to bright regions of the image are reflected with modulated rotated polarization (typically p-polarized) so that radiation from the bright pixels is transmitted through the beamsplitter configuration 166 and exits the prism 160 via transmission through the light-wave exit surface 172. The light then enters the prism 180 through the light-wave entrance surface 190 with the second polarization (typically p-polarized relative to the surface of the polarization selective beamsplitter configuration 186) and reaches the collimation surface 192 where it passes through the retardation plate 196, enters the lens 140, and is reflected back through the retardation plate 196 by the reflecting surface 141 of the lens 140. The double pass through the retardation plate 196 aligned with its fast axis at 45 degrees to the polarization axes rotates the polarization (e.g., transforming the p-polarization to s-polarization) so that the collimated image illumination is reflected at the polarization selective beamsplitter configuration 186 towards the light-wave exit surface 194 and exits the prism 180 as the beam of illumination 222. The beam of illumination 222 is then coupled into the LOE 212 by the coupling-in optical configuration 224 (as illustrated in FIG. 9).

The illumination arrangement 242, implemented, for example, as a source of polarized NIR light (which can be a combination of a NIR light source with a polarizer) is associated with the surface 188, which in this configuration is a light-wave entrance surface 188. The source of polarized NIR light is configured to emit polarized light in the first optical spectrum (i.e., polarized NIR light), represented schematically as incident beam 268. The polarized illumination 268 enters the prism 180 through the light-wave entrance surface 188 with a first polarization, typically a p-polarization relative to the surface of the polarization selective beamsplitter configuration 188, and is transmitted through the polarization selective beamsplitter configuration 186 and exits the prism 180 via transmission through the light-wave exit surface 194 as a beam of illumination 270. The p-polarized beam of illumination 270 is then coupled into the LOE 212 by the coupling-in optical configuration 224 (similar to as the beam of illumination 222). The p-polarized illumination 270 propagates through the LOE 212 (similar to the illumination 222), and is coupled out of the LOE 212 by the partially reflective surfaces 218. In this configuration, care should be taken to ensure that the NIR illumination propagating within the LOE 212 is coupled-out by the partially reflective surfaces 218 and that the NIR light emanating from the eye 210 (in response to illumination by the coupled-out NIR light) is not coupled back into the LOE. To this end, the partially reflective surfaces 218 are preferably coated such they have the desired reflectivity for s-polarized light in the NIR region at a prescribed range of incident angles such that the s-polarized NIR illumination propagating within the LOE 212 is coupled-out by the partially reflective surfaces 218 but the s-polarized NIR illumination emanating from the eye 210 is incident on the partially reflective surfaces 218 at incident angles outside of the prescribed range of incident angles and therefore passes through the partially reflective surfaces without reflection.

Although the embodiments of the apparatus 200 have thus far been described within the context of the LOEs 202 and 212 having a common (parallel) direction of elongation, other embodiments are possible in which the LOEs have directions of elongation which are orthogonal to each other. For example, the LOE 212 may be deployed so as to have a direction of elongation in the direction of the x-axis (as shown in FIG. 9), whereas the LOE 202 may be deployed so as to have a direction of elongation in the direction of the z-axis. In addition, it is noted that the embodiments of the apparatus 100 and 200 have been described within the context of LOEs 102 and 212 being "one-dimensional waveguides" or "1D waveguides", meaning that that LOEs 102 and 212 each have a single pair of parallel major surfaces (faces 104, 106 and faces 214, 216) defining a "slab-type waveguide" which guides image light (from an image projector 126, 228) so as to perform aperture expansion in one dimension. However, the eye-tracking apparatus according to the present embodiments are equally applicable to other waveguide constructions, including constructions in which an additional slab-type waveguide is coupled to each of the LOEs 102, 212 which guides image light in an orthogonal dimension so as to perform aperture expansion in the orthogonal dimension, producing an overall two-dimensional aperture expansion effect. Alternatively, one or both of the LOEs 102, 212 is a "two-dimensional waveguide" or "2D waveguide", meaning that it has two mutually orthogonal pairs of major surfaces which serve to guide image light (from an image projector 126, 228) in two dimensions as it propagates along the LOE so as to perform aperture expansion in two dimensions using a single waveguide.

Although the embodiments of the present disclosure have been described within the context of illumination arrangements deployed to illuminate the eye with light in the near infrared region of the electromagnetic spectrum, the embodiments of the present disclosure should not be limited to illumination arrangements that emit eye-tracking light in any specific region of the electromagnetic spectrum. The description of using NIR light for eye-tracking purposes is for example purposes in order to provide a clearer explanation of the construction and operation of the various apparatus of the present disclosure. Other types of light may also be used for eye-tracking purposes, including, but not limited to, light in the infrared region, and ultra-violet light emitted at low intensity and short pulse duration.

According to certain non-limiting implementations, the various eye-tracking apparatus of the present disclosure may be duplicated for tracking both eyes of a subject simultaneously, as well as for projecting images to both eyes. For example, the apparatus 100 and/or the apparatus 200 may be duplicated for both eyes. By combining data from two eye trackers, it may be possible to achieve enhanced stability and continuity of tracking. For example, while the eyes are moving, the trackable portions of the eyes may be visible to the tracker in one eye and not the other. If a tracking algorithm is used which employs tracking of trackable features, simultaneous tracking for both eyes allows the tracking to be maintained continuously through periods in which only one eye-tracker can track the blind spot.

Where an apparatus is binocular, each eye has its own image projection and eye tracking device, and various processing and power-supply components may optionally be shared between the two eye-tracking systems. The eye-tracking information gleaned by the binocular eye-tracking devices can be fused in order to provide enhanced stability and continuity of tracking, as mentioned above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus, comprising:
a light-transmitting substrate having at least two parallel major surfaces for guiding light by internal reflection, a first of the major surfaces being deployed in facing relation to an eye;
an optical element associated with the first of the major surfaces, the optical element configured for selectively applying optical power to incident light in accordance with at least one property of the incident light that includes a polarization direction of the incident light, such that the optical element applies optical power to incident light returned from the eye that is polarized in a first polarization direction so as to collimate the incident light returned from the eye that is polarized in the first polarization direction and such that the optical element applies substantially no optical power to incident light coupled out of the light-transmitting substrate that is polarized in a second polarization direction orthogonal to the first polarization direction;
an optical coupling configuration associated with the light-transmitting substrate and configured for:
coupling-in a proportion of light returned from the eye that is polarized in the first polarization direction, collimated by the optical element and incident on the first of the major surfaces, so as to propagate within the light-transmitting substrate by internal reflection, and
coupling-out a proportion of light that is polarized in the second polarization direction propagating within the light-transmitting substrate;
optics associated with the light-transmitting substrate and configured for converting the collimated light that is polarized in the first polarization direction, propagating within the light-transmitting substrate by internal reflection, into converging beams of captured light;
an optical sensor deployed for sensing the captured light; and at least one processor electrically associated with the optical sensor and configured to process signals from the optical sensor to derive a current gaze direction of the eye.

2. The apparatus of claim 1, wherein the at least one property of the incident light further includes a region of the electromagnetic spectrum occupied by the incident light.

3. The apparatus of claim 1, wherein the light that is polarized in the first polarization direction is within a first optical spectrum, and wherein the light that is polarized in the second polarization direction is within a second optical spectrum.

4. The apparatus of claim 1, further comprising:
a polarizer associated with a second of the major surfaces of the light-transmitting substrate.

5. The apparatus of claim 1, wherein the light-transmitting substrate is deployed with the first of the major surfaces at an eye relief distance from the eye, and wherein the optical element has a focal length approximately equal to the eye relief distance.

6. The apparatus of claim 1, further comprising:
a second optical coupling configuration associated with the optics and configured for:
coupling-out a proportion of light that is polarized in the first polarization direction propagating within the light-transmitting substrate such that the coupled-out light is received by the optics, and
coupling-in a proportion of light that is polarized in the second polarization direction, from a display source, so as to propagate within the light-transmitting substrate by internal reflection.

7. The apparatus of claim 1, further comprising:
an illumination arrangement deployed to illuminate the eye with light that is polarized in the first polarization direction.

8. The apparatus of claim 1, further comprising:
an image projector coupled to the light-transmitting substrate so as to introduce collimated light that is polarized in the second polarization direction and that corresponds to an image into the light-transmitting substrate such that the coupled-in collimated light that is polarized in the second polarization direction propagates by internal reflection within the light-transmitting substrate and is coupled out of the light-transmitting substrate toward the eye by the optical coupling configuration.

9. The apparatus of claim 8, wherein the image projector includes a reflective-display device that produces polarized light in response to illumination from a polarized source of light, and wherein the polarized light produced by the reflective-display device is collimated by the optics.

10. The apparatus of claim 1, wherein the optical coupling configuration includes a plurality of partially reflective surfaces deployed within the light-transmitting substrate obliquely to the major surfaces of the light-transmitting substrate.

11. The apparatus of claim 1, wherein light that is polarized in the first polarization direction propagates within the light-transmitting substrate in a first propagation direction, and wherein light that is polarized in the second polarization direction propagates within the light-transmitting substrate in a second propagation direction opposite the first propagation direction.

12. An apparatus, comprising:
a light-transmitting substrate having a pair of parallel major surfaces for guiding light by internal reflection, a first of the major surfaces being deployed in facing relation to an eye of a viewer;
a lens associated with the first of the major surfaces, the lens configured for selectively applying optical power to incident light according to a polarization direction:
the lens applies optical power to incident light returned from the eye that is polarized in a first polarization direction so as to collimate the incident light returned from the eye that is polarized in the first polarization direction, and
the lens applies substantially no optical power to incident light coupled out of the light-transmitting substrate that is polarized in a second polarization direction orthogonal to the first polarization direction;
an illumination arrangement deployed to illuminate the eye with light that is polarized in the first polarization direction such that a proportion of the light that is polarized in the first polarization direction is reflected by the eye back toward the lens so as to be collimated by the lens;
an optical module including:
a reflective-display device that produces light, corresponding to an image and that is polarized in the second polarization direction, in response to illumination from a source of light,
optics configured for collimating the light produced by the reflective-display device so as to produce collimated light that is polarized in the second polarization direction, and
an optical sensor;
an optical coupling configuration configured for coupling the collimated light that is polarized in the second polarization direction into the light-transmitting substrate so as to propagate within the light-transmitting substrate by internal reflection in a first propagation direction;
a plurality of partially reflective surface deployed within the light-transmitting substrate obliquely to the major surfaces of the light-transmitting substrate, the partially reflective surfaces configured for:
coupling-out a proportion of light that is polarized in the second polarization direction, propagating within the light-transmitting substrate in the first propagation direction, and
coupling-in a proportion of the collimated light that is polarized in the first polarization direction incident on the first of the major surfaces, so as to propagate within the light-transmitting substrate in a second propagation direction, wherein the optical coupling configuration is further configured for coupling-out the propagating light that is polarized in the first polarization direction; and
at least one processor electrically coupled to the optical sensor,
wherein the optics of the optical module are further configured for receiving the light coupled-out by the optical coupling configuration and for converting the coupled-out light into converging beams of captured light, wherein the optical sensor is configured for sensing the captured light, and wherein the at least one processor is configured to process signals from the optical sensor to derive a current gaze direction of the eye.

13. The apparatus of claim 12, wherein the light that is polarized in the first polarization direction is within a first optical spectrum, and wherein the light that is polarized in the second polarization direction is within a second optical spectrum.

14. An apparatus, comprising:
- a light-transmitting substrate having at least two parallel major surfaces for guiding light by internal reflection, a first of the major surfaces being deployed in facing relation to an eye;
- an image projector that produces light, polarized in a first polarization direction, corresponding to a collimated image;
- a first optical coupling configuration that introduces the light corresponding to the collimated image into the light-transmitting substrate such that the light corresponding to the collimated image propagates within the light-transmitting substrate by internal reflection at the parallel major surfaces;
- a second optical coupling configuration that deflects a proportion of the light corresponding to the collimated image propagating within the light-transmitting substrate;
- an optical element associated with the first of the major surfaces, the optical element configured to selectively apply optical power to incident light in accordance with at least one property of the incident light that includes a polarization direction of the incident light, such that the optical element applies optical power to incident light returned from the eye that is polarized in a second polarization direction orthogonal to the first polarization direction so as to collimate the incident light returned from the eye that is polarized in the second polarization direction, and such that the optical element applies substantially no optical power to the light corresponding to the collimated image coupled out of the light-transmitting substrate, wherein the second optical coupling configuration deflects the collimated light that is polarized in the second polarization direction into the light-transmitting substrate so as to propagate within the light-transmitting substrate by internal reflection;
- optics associated with the light-transmitting substrate and configured for converting the collimated light that is polarized in the second polarization direction, propagating within the light-transmitting substrate by internal reflection, into converging beams of captured light, wherein the first optical coupling configuration deflects a proportion of the collimated light that is polarized in the second polarization direction, propagating within the light-transmitting substrate, toward the optics;
- an optical sensor deployed for sensing the captured light; and
- at least one processor electrically associated with the optical sensor and configured to process signals from the optical sensor to derive a current gaze direction of the eye.

* * * * *